US012561555B2

(12) United States Patent
Zhu et al.

(10) Patent No.: US 12,561,555 B2
(45) Date of Patent: Feb. 24, 2026

(54) NETWORK OF TENSOR TIME SERIES

(71) Applicants:International Business Machines Corporation, Armonk, NY (US); The Board of Trustees of the University of Illinois, Urbana, IL (US)

(72) Inventors: Yada Zhu, Irvington, NY (US); Hanghang Tong, Champaign, IL (US); Baoyu Jing, Urbana, IL (US); Jinjun Xiong, Goldens Bridge, NY (US); Nitin Gaur, Round Rock, TX (US); Anna Wanda Topol, Clifton Park, NY (US)

(73) Assignees: International Business Machines Corporation, Armonk, NY (US); The Board of Trustees of the University of Illinois, Urbana, IL (US)

( * ) Notice: Subject to any disclaimer, the term of this patent is extended or adjusted under 35 U.S.C. 154(b) by 1226 days.

(21) Appl. No.: 17/184,880

(22) Filed: Feb. 25, 2021

(65) Prior Publication Data

US 2022/0284277 A1     Sep. 8, 2022

(51) Int. Cl.
*G06N 3/08* (2023.01)
*G06N 3/04* (2023.01)
(Continued)

(52) U.S. Cl.
CPC ............... *G06N 3/08* (2013.01); *G06N 3/044* (2023.01); *G06N 3/045* (2023.01)

(58) Field of Classification Search
CPC ..... G01W 2001/003; G01W 2001/006; G08G 1/0125; G06N 3/02; G06N 3/06; G06N 3/08; G06N 3/44; G06N 3/45
See application file for complete search history.

(56) References Cited

U.S. PATENT DOCUMENTS

| | | | |
|---|---|---|---|
| 10,013,289 | B2 | 7/2018 | Kung et al. |
| 2016/0004664 | A1 | 1/2016 | Bouchard et al. |

(Continued)

FOREIGN PATENT DOCUMENTS

| | | |
|---|---|---|
| CN | 106528679 A | 3/2017 |
| CN | 107798385 A | 3/2018 |

(Continued)

OTHER PUBLICATIONS

Q. Wu, Z. Jiang, K. Hong, H. Liu, L. T. Yang and J. Ding, "Tensor-Based Recurrent Neural Network and Multi-Modal Prediction With Its Applications in Traffic Network Management," in IEEE Transactions on Network and Service Management, vol. 18, No. 1, pp. 780-792 (Year: 2021).*

(Continued)

*Primary Examiner* — Van C Mang
(74) *Attorney, Agent, or Firm* — Scully, Scott, Murphy & Presser, P.C.; Robert D. Bean

(57)     ABSTRACT

One or more machine learning models for a network of tensor time series can be provided. Co-evolving time series having multiple modes can be received. A tensor graph convolutional network can be trained, using the co-evolving time series and adjacency matrices associated with the multiple modes in the co-evolving time series, to generate node embeddings associated with a snapshot of the co-evolving time series at time t. A tensor recurrent neural network can be trained to generate temporal dynamics associated with the co-evolving time series based on the generated node embeddings. A neural network model can be trained to forecast a prediction for the co-evolving time series based on the generated node embeddings and the generated temporal dynamics. The tensor graph convolutional network, the tensor recurrent neural network and the neural network model can be trained jointly.

17 Claims, 12 Drawing Sheets

(51) Int. Cl.
G06N 3/044 (2023.01)
G06N 3/045 (2023.01)

(56) References Cited

U.S. PATENT DOCUMENTS

| | | | |
|---|---|---|---|
| 2019/0325340 A1 | 10/2019 | Nitta et al. | |
| 2021/0357772 A1* | 11/2021 | Egorov | G06F 16/258 |

FOREIGN PATENT DOCUMENTS

| | | | | |
|---|---|---|---|---|
| CN | 110321401 A | 10/2019 | | |
| CN | 110797123 A | 2/2020 | | |
| CN | 111475496 A | 7/2020 | | |
| CN | 111260919 B * | 6/2021 | | G06N 3/02 |
| KR | 10-1271694 B1 | 6/2013 | | |
| KR | 10-1789078 B1 | 10/2017 | | |
| WO | WO-2021020489 A1 * | 2/2021 | | G06N 5/04 |

| | | | | |
|---|---|---|---|---|
| WO | WO-2021149528 A1 * | 7/2021 | | G06N 3/0442 |

OTHER PUBLICATIONS

Zhang, S., Tong, H., Xu, J. et al. Graph convolutional networks: a comprehensive review. Comput Soc Netw 6, 11 (Year: 2019).*

Zhang, Tong, et al. "Tensor Graph Convolutional Neural Network" arXiv [Cs.CV] (Year: 2018).*

Chu, Yunfei, et al. âDynamic Sequential Graph Learning for Click-Through Rate Predictionâ. arXiv [Cs.IR], 2021, http://arxiv.org/abs/2109.12541. arXiv. (Year: 2021).*

Singer, "Node Embedding over Temporal Graphs", 2019 (Year: 2019).*

Abedini "An MLP-based representation of neural tensor networks for the RDF data models" (Year: 2017).*

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

Receive Co-evolving Time Series Having Multiple Modes ⟶ 802

Model Tensor Graph Convolutional Network ⟶ 804

Train Tensor Graph Convolutional Network ⟶ 806

Model Tensor Recurrent Neural Network ⟶ 808

Train Tensor Recurrent Neural Network ⟶ 810

Train Neural Network Model to Forecast Prediction ⟶ 812

NETWORK OF TENSOR TIME SERIES

BACKGROUND

The present application relates generally to computers and computer applications, and more particularly to machine learning in tensor time series.

In many applications, such as smart building monitoring, financial analysis and traffic monitoring, the sequence data is a co-evolving time series, which presents challenges for analysis and forecasting, including, for example, machine learning analysis and forecasting. These challenges, for example, are posed by a multi-mode tensor structure at each time step, each mode of the tensor time series corresponding to a network constraint, such as in financial knowledge graphs, and in the temporal correlation of consecutive data points. While a separate machine learning model can be applied to each time series, such models may not be able to capture relationships among the co-evolving time series. Such mechanism also may be less efficiency in computer memory usage.

BRIEF SUMMARY

The summary of the disclosure is given to aid understanding of a network of tensor time series, and computer systems and methods thereof, disclosed herein, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their methods of operations to achieve different effects.

A computer-implemented method, in an aspect, can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include imputing missing values in the co-evolving time series based on the node embeddings.

In yet another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings.

In still another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The tensor recurrent neural network can be structured to reduce dimensionality of the generated node embeddings.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The tensor recurrent neural network can include a tensor long short-term memory.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The method can also include training a neural network model to forecast a prediction for the co-evolving time series based on the generated node embeddings and the generated temporal dynamics. The neural network model can include a multi-layer perceptron.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The method can also include training a neural network model to forecast a prediction for the co-evolving time series based on the generated node embeddings and the generated temporal dynamics. The co-evolving time series can include sensor data from an environment and the neural network model can be trained to forecast a future value associated with at least one factor in the environment.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The method can also include training a neural network model to forecast a prediction for the co-evolving time series based on the generated node embeddings and the generated temporal dynamics. The co-evolving time series can include traffic data associated with an area and the neural network model can be trained to forecast future traffic in the area.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The method can also include training a neural network model to forecast a prediction for the co-evolving time series based on the generated node embeddings and the generated temporal dynamics. The co-evolving time series can include financial time series and the neural network model can be trained to forecast future financial portfolio performance.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The method can also include training a neural network model to forecast a prediction for the co-evolving time series based on the generated node embeddings and the generated temporal dynamics. The method can also include running the trained tensor graph convolutional network, the trained tensor recurrent neural network and the trained neural network using input time series data.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The method can also include training a neural network model to forecast a prediction for the co-evolving time series based on the generated node embeddings and the generated temporal dynamics. The method can also include running the trained tensor graph convolutional network, the trained tensor recurrent neural network and the trained neural network using input time series data. The input time series data can include environment data, where the neural network forecasts future environment factors. The method can further include, based on the forecasted future environment factors, controlling a controller that changes at least one of the environment factors.

In another aspect, a computer-implemented method can include receiving co-evolving time series having multiple modes. The method can also include structuring a tensor graph convolutional network that incorporates the multiple modes and relationships of the multiple modes. The method can further include training the tensor graph convolutional network to generate node embeddings associated with a snapshot of the co-evolving time series at time t. The method can also include structuring a tensor recurrent neural network. The method can further include training the tensor recurrent neural network to generate temporal dynamics associated with the co-evolving time series based on the generated node embeddings. The method can also include training a neural network model to forecast a prediction for the co-evolving time series based on the generated node embeddings and the generated temporal dynamics. The method can also include running the trained tensor graph convolutional network, the trained tensor recurrent neural network and the trained neural network using input time series data. The input time series data can traffic data associated with an area, where the neural network forecasts future traffic associated with the area. The method can further include, based on the forecasted future traffic, causing a vehicle to change a route of travel.

In yet another aspect, a computer-implemented method can include receiving co-evolving time series having multiple modes. The method can also include training the tensor graph convolutional network, using the co-evolving time series and adjacency matrices associated with the multiple modes in the co-evolving time series, to generate node embeddings associated with a snapshot of the co-evolving time series at time t. The method can also include training a tensor recurrent neural network to generate temporal dynamics associated with the co-evolving time series based on the generated node embeddings. The method can further include training a neural network model to forecast a prediction for the co-evolving time series based on the generated node embeddings and the generated temporal dynamics, where the training of the tensor graph convolutional network, the tensor recurrent neural network and the neural network model are performed jointly.

A computer system, for example, including one or more hardware processors configured to perform one or more methods described herein can also be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
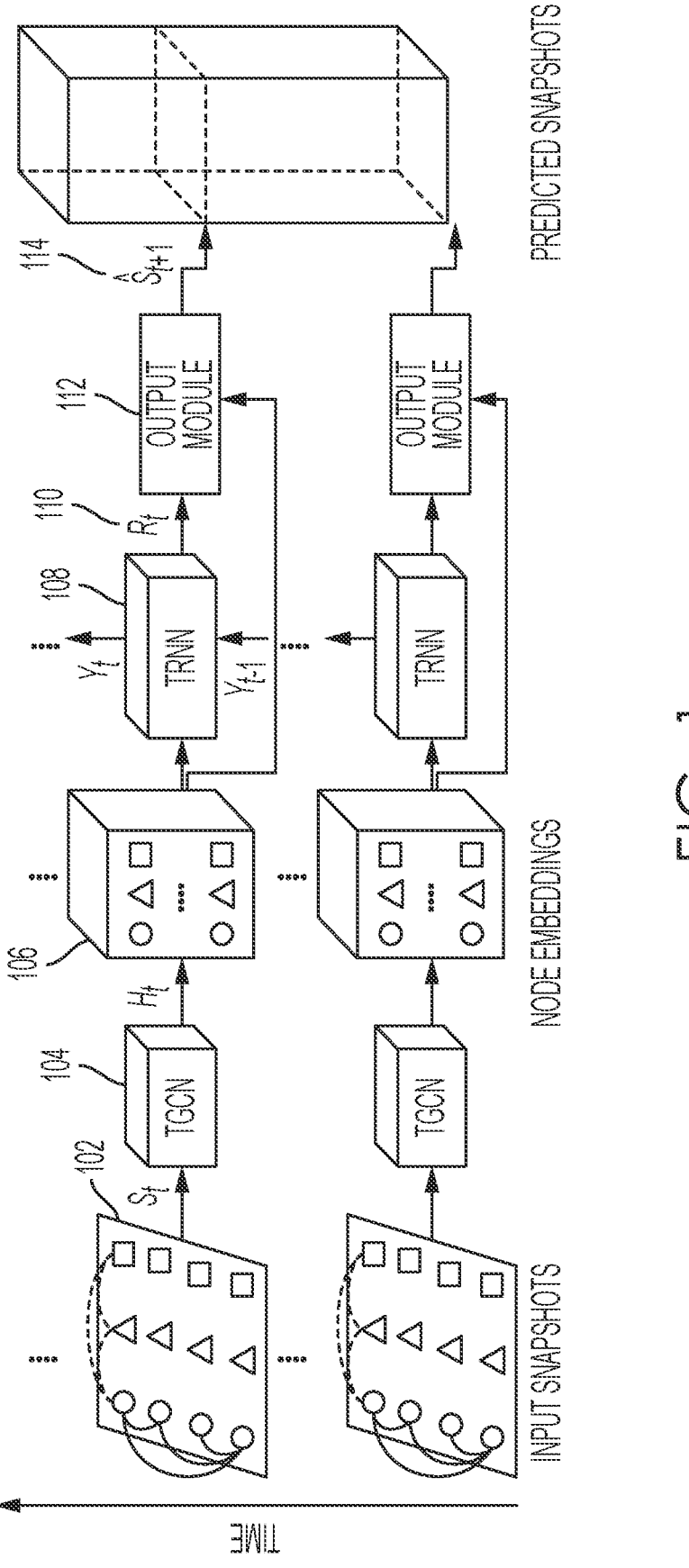
FIG. 1 illustrates a framework of a network of tensor time series model (NeT) in an embodiment.

In one or more embodiments, systems and methods can be provided for network of tensor time series, for example, a machine learning architecture and/or model, which can perform time series forecasting or prediction. A system and/or method, in one or more embodiments, jointly model networks of tensor series, for example, to improve forecasting performance, for example, improve forecast accuracy, and missing value recovery. In one or more embodiments, the system and/or method can be embodied in a variety of real-world applications. The system and/or method can also be integrated with a time series forecasting toolkit, for example, which can be cloud computing based, for providing predictions, for example, financial market predictions, environment predictions, and/or others. The predictions can be real-time predictions.

A system can include computer components and/or computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. One or more methods described herein include computer-implemented methods, for example, implemented by or run on computer systems or processors, for example, including components.

In one or more embodiments, a network of tensor time series framework jointly models properties of high dimensional time series, e.g., multi-mode, contextual network constraints for different modes (e.g., dependencies and/or relationship between or among modes), and temporal correlation. In one or more embodiment, this framework can include a multi-view GCN (MVGCN), which includes an ensemble of multiple independent GCNs, a tensor GCN (TGCN), which captures the synergy among different networks, and a tensor RNN (TRNN), which captures the common temporal dynamics of multiple time series and reduces the number of parameters.

A time series refers to a sequence data indexed in time order, a collection of observations or measurements taken over time. A time series is also referred to as time-stamped data. Co-evolving time series appears in many real-world applications. Examples include, but are not limited to, environmental monitoring, financial analysis, and smart transportation. The system and method, in one or more embodiments, model its multi-mode tensor structure at each time step; incorporate explicit relationship networks of the time series; and model the implicit relationship of the temporal dynamics. The system and method, in one or more embodiments provide or build a model referred to as Network of Tensor Time Series (NeT), which can include following modules, Tensor Graph Convolutional Network (TGCN) and Tensor Recurrent Neural Network (TRNN). In an embodiment, TGCN generalizes Graph Convolutional Network (GCN) for flat graphs to tensor graphs, which captures the synergy between multiple graphs associated with the tensors. TGCN can model a co-evolving time series' multi-mode tensor structure at each time step and incorporate relationship networks of the time series. In an embodiment, TRNN leverages tensor decomposition to balance the trade-off between the commonality and specificity of the co-evolving time series.

For example, at each time step t, a model takes a snapshot from the tensor time series and extracts its node embedding tensor via Tensor Graph Convolutional Network (TGCN) module. The extracted node embedding is fed into the Tensor RNN (TRNN) module to encode the temporal dynamics. An output module takes both of the hidden states of TRNN and the embedding learned by TGCN to predict the snapshot of the next time step.

Figures 2A, 2B, 2C, 2D:
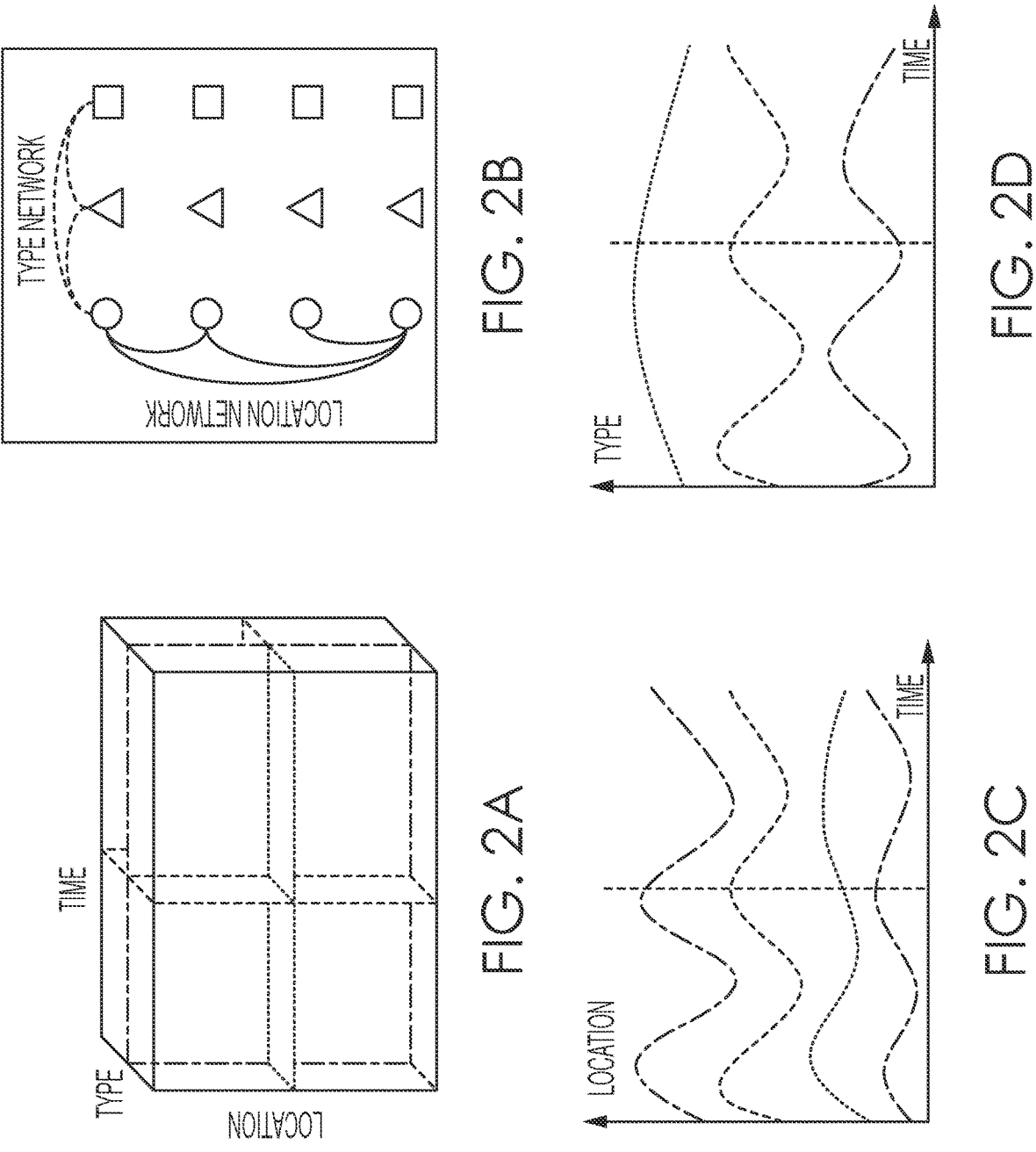
FIG. 2A shows an example tensor time series including three modes: location, data type and time, in an embodiment.
FIG. 2B shows a temporal snapshot of an example co-evolving time series in an embodiment.
FIG. 2C shows a slice along one data type associated with a mode (e.g., different locations) in an example time series in an embodiment.
FIG. 2D shows a slice along a mode of an example co-evolving time series in an embodiment.

Co-evolving time series occurs in many applications, for example, environmental monitoring, financial analysis, smart transportation, and others. FIGS. 2A-2D illustrate an example tensor time series and three slices along different dimensions. FIG. 2A shows a tensor time series including three modes: location, data type and time. FIG. 2B shows a temporal snapshot. In FIG. 2B, rows and columns present locations and data types, which can be constrained by their networks. As shown in FIGS. 2A and 2B, a temporal snapshot of a co-evolving time series forms a multi-dimensional array, referred to as a multi-mode tensor. By way of example, a spatial-temporal monitoring data of atmosphere can include a time series of an $N_1 \times N_2 \times N_3 \times N_4$ tensor, where $N_1$, $N_2$, $N_3$ and $N_4$ denote latitude, longitude, elevation and air conditions (e.g., temperature, pressure and oxygen concentration), respectively. As another example, companies' financial data can include a time series of an $N_1 \times N_2 \times N_3$ tensor, where $N_1$, $N_2$, and $N_3$ denote the companies, the types of financial data (e.g. revenue, expenditure) and the statistics associated with the financial data, respectively.

Data points within a tensor are usually related to each other, and different modes are associated with different relationships. FIG. 2B shows relationships of different modes in a time series tensor. Within the above example of environmental monitoring, along geospatial modes ($N_1$, $N_2$ and $N_3$), one could know the (latitudinal, longitudinal and elevational) location relationship between two data points. In addition, different data types ($N_4$) can be also related with each other. For example, given fixed mass and volume, the pressure of a gas is proportional to the Kelvin temperature. As another example, in time series related to traffic application, speed and occupancy can be examples of different modes. These relationships can be explicitly modeled by networks. In an embodiment, the system and method builds or implements multiple graphs associated with a tensor (referred to as tensor graphs herein), for instance, a deep convolutional method for tensor graphs. In an embodiment, the system and method provides a Tensor Graph Convolution Network (TGCN), for example, by leveraging Chebyshev polynomials and tensor algebra.

A challenge for modeling the temporal dynamics behind co-evolving time series can be learning to capture the implicit relationship of different time series. FIG. 2C shows a slice along one data type: co-evolving time series of one data type at different locations. As shown in FIG. 2C, the temporal patterns of time series with the same data type (e.g., temperature) are similar. The relationship of the co-evolving temperature time series can be partially captured by the location network, e.g., two neighboring locations often have similar temporal dynamics. However, the temperature time series from two locations far apart could also share similar patterns. In an embodiment, the system and method may model the implicit relationship between different time series by implementing a novel Tensor Recurrent Neural Network (TRNN) based on multi-linear dynamic system (MLDS) and Tucker decomposition, which helps reduce both noise and the number of model parameters. Reducing the number of model parameters can provide for memory efficiency in computing environment or computer systems. FIG. 2D shows an example slice along one location: co-evolving time series of different data types at the same location.

In an embodiment, a graph convolution for tensor graphs can be provided. A TGCN generalizes GCN. In an embodiment, the new architecture can capture the synergy among different graphs by simultaneously performing convolution on them.

In an embodiment, a TRNN can be provided. In an embodiment, the TRNN can be based on MLDS for efficiently modeling the implicit relationship between temporal dynamics (e.g., which can be complex) of tensor time series. Graph Convolution on Flat Graphs Analogous to the one-dimensional Discrete Fourier Transform (Definition 2.2), the graph Fourier transform is given by Definition 2.3 in an embodiment. Then the spectral graph convolution (Definition 2.4) is defined based on one-dimensional convolution and the convolution theorem. The free parameter of the convolution filter is further replaced by Chebyshev polynomials and thus there can be Chebyshev approximation for graph convolution (Definition 2.5).

Definition 2.1 (Flat Graph) in an embodiment. A flat graph includes of a graph signal with N nodes $x \in \mathbb{R}^N$ and its adjacency matrix $A \in \mathbb{R}^{N \times N}$.

Definition 2.2 (Discrete Fourier Transform) in an embodiment. Given an one dimensional signal $x \in \mathbb{R}^N$, where N is the length of the sequence, its Fourier transform is defined by:

$$\tilde{x}[n] = \sum_{k=1}^{N} x[k] e^{-\frac{i2\pi}{N}kn} \tag{1}$$

where x[k] is the k-th element of x and $\tilde{x}[n]$ is the n-th element of the transformed vector $\tilde{x}$. The above definition can be rewritten as:

$$\tilde{x} = Fx \tag{2}$$

where $F \in \mathbb{R}^{N \times N}$ is the filter matrix and $$F[n, k] = e^{-\frac{i2\pi}{N}kn}.$$

Definition 2.3 (Graph Fourier Transform) in an embodiment. Given a graph signal $x \in \mathbb{R}^N$, along with its adjacency matrix $A \in \mathbb{R}^{N \times N}$, where N is the number of nodes, the graph Fourier transform is defined by:

$$\tilde{x} = \Phi^T x \tag{3}$$

where $\Phi$ is the eigenvector matrix of the graph Laplacian matrix $$L = I - D^{-\frac{1}{2}} A D^{-\frac{1}{2}} = \Phi \Lambda \Phi^T,$$

$I \in \mathbb{R}^{N \times N}$, $D \in \mathbb{R}^{N \times N}$ denote the identity matrix and the degree matrix and $\Lambda$ is a diagonal matrix whose diagonal elements are eigenvalues.

Definition 2.4 (Spectral Graph Convolution) in an embodiment. Given a signal $x \in \mathbb{R}^N$ and a filter $g \in \mathbb{R}^N$, the spectral graph convolution is defined in the Fourier domain according to the convolution theorem:

$$\Phi^T(g \star x) = (\Phi^T g) \odot (\Phi^T x) \tag{4}$$

$$g \star x = \Phi(\Phi^T g) \odot (\Phi^T x) = \Phi \text{diag}(\tilde{g}) \Phi^T x \tag{5}$$

where $\star$ and $\odot$ denote convolution operation and Hadamard product; the second equation holds due to the orthonormality.

Definition 2.5 (Chebyshev Approximation for Spectral Graph Convolution) in an embodiment. Given an input graph signal $x \in \mathbb{R}^N$ and its adjacency matrix $A \in \mathbb{R}^{N \times N}$, the Chebyshev approximation for graph convolution on a flat graph is given by:

$$g_\theta \star x = \Phi(\Sigma_{p=0}^{P}\theta_p T_p(\tilde{\Lambda}))\Phi^T x = \Sigma_{p=0}^{P}\theta_p T_p(\tilde{L})x \qquad (6)$$

where $$\tilde{\Lambda} = \frac{2}{\lambda_{max}}\Lambda - I$$

is the normalized eigenvalues, $\lambda_{max}$ is maximum eigenvalue of the matrix $\Lambda$;

$$\tilde{L} = \frac{2}{\lambda_{max}}L - I;$$

$T_p(x)$ is Chebyshev polynomials defined by $T_p(x)=2xT_{p-1}(x)-T_{p-2}(x)$ with $T_0(x)=1$ and $T_1(x)=x$, and p denotes the order of polynomials; $g_\theta$ and $\theta_p$ denote the filter vector and the parameter respectively.

Tensor Algebra

Definition 2.6 (Mode-m Product) in an embodiment. The mode-m product generalizes matrix-matrix product to tensor-matrix product. Given a matrix $U \in \mathbb{R}^{N_m \times N'}$, and a tensor $\chi \in \mathbb{R}^{N_1 \times \ \ \ N_{m-1} \times N_m \times N_{m+1} \ \ \ \times N_M}$, then $\chi \times_m U \in \mathbb{R}^{N_1 \times \ldots N_{m-1} \times N' \times N_{m+1} \ldots \times N_M}$ is its mode-m product. Its element $[n_1, \ldots, n_{m-1}, n', n_{m+1}, \ldots, n_M]$ is defined as:

$$(\chi \times_m U)[n_1, \ldots, n_{m-1}, n', n_{m+1}, \ldots, n_M] = \Sigma_{n_m=1}^{N_m}\chi[n_1, \ldots, n_{m-1}, n_m, n_{m+1}, \ldots, n_M]U[n_m, n'] \qquad (7)$$

Definition 2.7 (Tucker Decomposition) in an embodiment. The Tucker decomposition can be viewed as a form of high-order principal component analysis. A tensor $\chi \in \mathbb{R}^{N_1 \times \cdots \times N_M}$ can be decomposed into a smaller core tensor $\mathcal{Z} \in \mathbb{R}^{N'_1 \times \cdots \times N'_M}$ by M orthonormal matrices $U_m \in \mathbb{R}^{N'_m \times N_m}$ ($N'_m < N_m$):

$$\chi = \mathcal{Z} \Pi_{m=1}^{M} \times_m U_m \qquad (8)$$

The matrix $U_m$ includes principal components for the m-th mode and the core tensor $\mathcal{Z}$ indicates the interactions among the components. Due to the orthonormality of $U_m$, there can be:

$$\mathcal{Z} = \chi \Pi_{m=1}^{M} \times_m U_m^T \qquad (9)$$

Multi-Dimensional Fourier Transform

Definition 2.8 (Multi-dimensional Discrete Fourier Transform) in an embodiment. Given a multi-dimensional/mode signal $\chi \in \mathbb{R}^{N_1 \times \cdots \times N_M}$, the multi-dimensional Fourier transform is defined by:

$$\tilde{\chi}[n_1, \ldots, n_M] = \prod_{m=1}^{M} \sum_{k_m=1}^{N_m} e^{-\frac{i2\pi}{N_m}k_m n_m}\chi[k_1, \ldots, k_M] \qquad (10)$$

Similar to the one-dimensional Fourier transform (Definition 2.2), the above equation can be re-written by a multi-linear form:

$$\tilde{\chi} = \chi \times_1 F_1 \ldots \times_M F_M = \chi \Pi_{m=1}^{M} \times_m F_m \qquad (11)$$

where $\times_m$ denotes the mode-m product, $F_m \in \mathbb{R}^{N_m \times N_m}$ is the filter matrix, and $$F_m[n, k] = e^{-\frac{i2\pi}{N_m}kn}.$$

Definition 2.9 (Separable Multi-dimensional Convolution) in an embodiment. The separable multi-dimensional convolution is defined based on Definition 2.8. Given a signal $\chi \in \mathbb{R}^{N_1 \times \cdots \times N_M}$ and a separable filter $\mathcal{Y} \in \mathbb{R}^{N_1 \times \cdots \times N_M}$ such that $\mathcal{Y}[n_1, \ldots, n_m]=y_1[n_1] \ldots y_M[n_m]$, where $y_m \in \mathbb{R}^{N_m}$ is the filter vector for the m-th mode, then the multi-dimensional convolution is the same as iteratively applying one dimensional convolution onto $\chi$:

$$\mathcal{Y} \star \chi = y_1 \star_1 \ldots \star_{M-1}y_M \star_M \chi \qquad (12)$$

where $\star_m$ denotes convolution on the m-th mode.

Suppose $\chi \in \mathbb{R}^{N_1 \times N_2}$ and $\mathcal{Y}=y_1 \cdot y_2^T$, where $y_1 \in \mathbb{R}^{N_1}$ and $y_2 \in \mathbb{R}^{N_2}$. Then $\mathcal{Y} \star \chi$ can mean applying $y_1$ and $y_2$ to the rows and columns of $\chi$ respectively. Formally there can be:

$$\mathcal{Y} \star \chi = y_1 \star_1 y_2 \star_2 \chi = Y_1^T\chi Y_2 = \chi \Pi_{m=1}^{2} \times_m Y_m \qquad (13)$$

where $Y_1 \in \mathbb{R}^{N_1 \times N_1}$ and $Y_2 \in \mathbb{R}^{N_2 \times N_2}$ are the transformation matrix corresponding to $y_1$ and $y_2$ respectively.

Definition 2.10 (Tensor Time Series) in an embodiment. A tensor time series is a (M+1)-mode tensor $\mathcal{S} \in \mathbb{R}^{N_1 \times \cdots \times N_M \times T}$, where the (M+1)-th is the time and its dimension is T.

Definition 2.11 (Tensor Graph) in an embodiment. A tensor graph includes a M-mode tensor $\chi \in \mathbb{R}^{N_1 \times \cdots \times N_M}$ and the adjacency matrices for each mode $A_m \in \mathbb{R}^{N_m \times N_m}$. Note that if m-th mode is not associated with an adjacency matrix, then $A_m=I_m$, where $I_m \in \mathbb{R}^{N_m \times N_m}$ denotes the identity matrix.

Definition 2.12 (Network of Tensor Time Series) in an embodiment. A network of tensor time series includes (1) a tensor time series $\mathcal{S} \in \mathbb{R}^{N_1 \times \cdots \times N_M \times T}$ and (2) a set of adjacency matrices $A_m \in \mathbb{R}^{N_m \times N_m}$ ($m \in [1, \ldots, M]$) for all the last mode (i.e., the time mode).

The following describes in one or more embodiments an overview of a network of tensor time series model (NeT). FIG. 1 illustrates a framework of a network of tensor time series model (NeT) in an embodiment. At each time step t, the model takes a snapshot $\mathcal{S}_t$ 102 from the tensor time series $\mathcal{S}$ and extracts its node embedding tensor $\mathcal{H}_t$ 106 via Tensor Graph Convolution Network (TGCN) module 104. $\mathcal{H}_t$ 106 is fed into the Tensor RNN (TRNN) module 108 to encode the temporal dynamics. The output module 112 takes both of $\mathcal{H}_t$ 106 and $\mathcal{R}_t$ 110 to predict the snapshot of the next time step $\hat{s}_{t+1}$ 114. $\mathcal{Y}_t$ and $\mathcal{Y}_{t+1}$ are the hidden states of TRNN at time step t and t+1 respectively.

For example, at each time step t, a Tensor Graph Convolutional Network (TGCN) 104 takes the t-th snapshot $\mathcal{S}_t \in \mathbb{R}^{N_1 \times \cdots \times N_M}$ 102 along with its adjacency matrices $\{A_m \in \mathbb{R}^{N_m \times N_m}\}_{m=1}^{M}$ from the tensor time series $\mathcal{S} \in \mathbb{R}^{N_1 \times \cdots \times N_M \times T}$ and extracts its node embedding tensor $\mathcal{H}_t$ 106, which is fed into a Tensor Recurrent Neural Network (TRNN) 108 to encode temporal dynamics and produce $\mathcal{R}_t$ 110. The output module 112 takes both $\mathcal{H}_t$ 106 and $\mathcal{R}_t$ 110 to predict the snapshot of the next time step $\hat{s}_{t+1}$ 114. $\mathcal{Y}_t$ in FIG. 1 denotes the hidden state of TRNN at the time step t. An example of the output module 112 can include a multi-layer perceptron.

Tensor Graph Convolution Network (TGCN)

In an embodiment, spectral graph convolution on tensor graphs and its Chebychev approximation can be provided. A detailed derivation for the layer-wise updating function of the TGCN is described below in an embodiment.

Spectral Convolution for Tensor Graph

Analogues to the multi-dimensional Fourier transform (Definition 2.8) and the graph Fourier transform on flat graphs (Definition 2.3), the methodology can define the Fourier transform on tensor graphs in Definition 3.1. Then based on the separable multi-dimensional convolution (Definition 2.9), and tensor graph Fourier transform (Definition 3.1), the methodology provides spectral convolution on tensor graphs in Definition 3.2. In Definition 3.3, the methodology can use Chebychev approximation in order to parameterize the free parameters in the filters of spectral convolution.

Definition 3.1 (Tensor Graph Fourier Transform) in an embodiment. Given a graph signal $\chi \in \mathbb{R}^{N_1 \times \cdots \times N_M}$, along with its adjacency matrices for each mode $A_m \in \mathbb{R}^{N_m \times N_m}$ ($m \in [1, \ldots, M]$), the tensor graph Fourier transform is defined by:

$$\hat{\chi} = \chi \Pi_{m=1}^{M} \times_m \Phi_m \tag{14}$$

where $\Phi_m$ is the eigenvector matrix of graph Laplacian matrix $L_m = \Phi_m \Lambda_m \Phi_m^T$ for $A_m$; $\times_m$ denotes the mode-m product.

Definition 3.2 (Spectral Convolution for Tensor Graph) in an embodiment. Given an input graph signal $\chi \in \mathbb{R}^{N_1 \times \cdots \times N_M}$, and a multi-dimensional filter $g \in \mathbb{R}^{N_1 \times \cdots \times N_M}$ defined by $g[n_1, \ldots, n_M] = g_1[n_1] \ldots g_M[n_M]$, where $g_m \in \mathbb{R}^{N_m}$ is the filter vector for the m-th mode. By analogizing to spectral graph convolution (Definition 2.4) and separable multi-dimensional convolution (Definition 2.9), the methodology can define spectral convolution for tensor graph as:

$$g \star \chi = \chi \Pi_{m=1}^{M} \times_m \Phi_m^T \text{diag}(\tilde{g}_m) \Phi_m \tag{15}$$

where $\tilde{g}_m = \Phi_m^T g_m$ is the Fourier transformed filter for the m-th mode; $\star$ and $\times_m$ denote the convolution operation and the mode-m product respectively; $\text{diag}(g_m)$ denotes the diagonal matrix, of which the diagonal elements are the elements in $g_m$.

Definition 3.3 (Chebyshev Approximation for Spectral Convolution on Tensor Graph) in an embodiment. Given a tensor graph $\chi \in \mathbb{R}^{N_1 \times \cdots \times N_M}$, where each mode is associated with an adjacency matrix $A_m \in \mathbb{R}^{N_m \times N_m}$, the Chebychev approximation for spectral convolution on tensor graphs is given by approximating $\tilde{g}_m$ by Chebyshev polynomials:

$$G_\theta * \chi = \chi \prod_{m=1}^{M} \times_m \Phi_m^T \left( \sum_{p_m=0}^{P} \theta_{m,p_m} T_{p_m}(\tilde{\Lambda}_m) \right) \Phi_m \tag{16}$$
$$= \chi \prod_{m=1}^{M} \times_m \sum_{p_m=0}^{P} \theta_{m,p_m} T_{p_m}(\tilde{L}_m)$$

where $G_\theta$ denotes the convolution filter parameterized by $\theta$; $\Lambda_m \in \mathbb{R}^{N_m \times N_m}$ is the matrix of eigenvalues for the graph Laplacian matrix $$L_m = I_m - D_m^{-\frac{1}{2}} A_m D_m^{-\frac{1}{2}} = \Phi_m \Lambda_m \Phi_m^T;$$
$$\tilde{\Lambda}_m = \frac{2}{\lambda_{m,max}} \Lambda_m - I_m$$

is the normalized eigenvalues, $\lambda_{m,max}$ is maximum eigenvalues in the matrix $$\tilde{L}_m = \frac{2}{\lambda_{m,max}} L_m - I_m;$$

$T_{p_m}(x)$ is Chebyshev polynomials defined by $T_{p_m}(x) = 2x T_{p_m-1}(x) - T_{p_m-2}(x)$ with $T_0(x) = 1$ and $T_1(x) = x$, and $p_m$ denotes the order of polynomials; $\theta_{m,p_m}$ denote the coefficient of $T_{p_m}(x)$. For clarity, the methodology may use the same polynomial degree P for all modes.

Tensor Graph Convolutional Layer

Due to the linearity of mode-m product, Equation (16) can be re-formulated as:

$$G_\theta * \chi = \sum_{p_1, \ldots, p_M=0}^{P} \chi \prod_{m=1}^{M} x_m \theta_{m,p_m} T_{p_m}(\tilde{L}_m) \tag{17}$$
$$= \sum_{p_1, \ldots, p_M=0}^{P} \prod_{m=1}^{M} \theta_{m,p_m} \chi \prod_{m=1}^{M} x_m T_{p_m}(\tilde{L}_m)$$

Equation (17) can be simplified. Firstly, let $\lambda_{m,max} = 2$ and there is:

$$\tilde{L}_m = \frac{2}{\lambda_{m,max}} L_m - I_m \tag{18}$$
$$= I_m - D_m^{-\frac{1}{2}} A_m D_m^{-\frac{1}{2}} - I_m$$
$$= -D_m^{-\frac{1}{2}} A_m D_m^{-\frac{1}{2}}$$

For clarity, the methodology may use $\tilde{A}_m$ to represent $$D_m^{-\frac{1}{2}} A_m D_m^{-\frac{1}{2}}.$$

Then the methodology may fix $P=1$ and drop the negative sign in Equation (18) by absorbing it to parameter $\theta_{m,p_m}$. Therefore, there can be $$\Sigma_{p=0}^{P} \theta_{m,p_m} T_p(\tilde{L}_m) = \theta_{m,0} + \theta_{m,1} \tilde{A}_m \tag{19}$$

By plugging Equation (19) back into Equation (17) and replacing the product of parameters $\Pi_{m=1}^{M} \theta_{m,p_m}$ by a single parameter $\theta_{p_1, \ldots, p_M}$, the methodology can obtain:

$$G_\theta \star \chi = \Sigma_{\exists p_m=1} \theta_{p_1, \ldots, p_M} \chi \Pi_{p_m=1} \times_m \tilde{A}_m \theta_{0, \ldots, 0} \chi \tag{20}$$

It can be observed from the above equation that $p_m$ works as an indicator for whether applying the convolution filter $\tilde{A}_m$ to $\chi$ or not. If $p_m=1$, then $\tilde{A}_m$ will be applied to $\chi$, otherwise, $I_m$ will be applied. When $p_m=0$ for $\forall m \in [1, \ldots, M]$, there can be $\theta_{0, \ldots, 0} \chi$. To better understand how the above approximation works on tensor graphs, assume $M=2$. Then there can be:

$$G_\theta \star \chi = \theta_{1,1} \chi \times_1 \tilde{A}_1 \times_2 \tilde{A}_2 + \theta_{1,0} \chi \times_1 \tilde{A}_1 + \theta_{0,1} \chi \times_2 \tilde{A}_2 + \theta_{0,0} \chi \tag{21}$$

Given the approximation in Equation (20), the tensor graph convolution layer can be provided in an embodiment in Definition 3.4.

Definition 3.4 (Tensor Graph Convolution Layer) in an embodiment. Given an input tensor $\chi \in \mathbb{R}^{N_1 \times \cdots \times N_M \times d}$, where d is the number of channels, along with its adjacency matrices $\{A_m\}_{m=1}^{M}$, the Tensor Graph Convolution Layer (TGCL) with d' output channels is defined by:

$$\text{TGCL}(\chi, \{A_m\}_{m=1}^{M}) = \sigma(\Sigma_{\exists p_m=1} \chi \Pi_{p_m=1} \times_m \tilde{A}_m \times_{M+1}$$
$$\Theta_{p_1, \ldots, p_M} + \chi \times_{M+1} \Theta_0) \tag{22}$$

where $\Theta \in \mathbb{R}^{d \times d'}$ is parameter matrix; $\sigma(\bullet)$ is activation function.

In the NeT model shown in FIG. 1, for example, given a snapshot $S_t \in \mathbb{R}^{N_1 \times \cdots \times N_M}$ along with its adjacency matrices $\{A_m\}_{m=1}^{M}$, the methodology can use a one layer TGCL to obtain the node embeddings $\mathcal{H}_t \in \mathbb{R}^{N_1 \times \cdots \times N_M \times d}$, where d is the dimension of the node embeddings:

$$\mathcal{H}_t = \text{TGCN}(S_t) \tag{23}$$

Synergy Analysis

Figure 3:
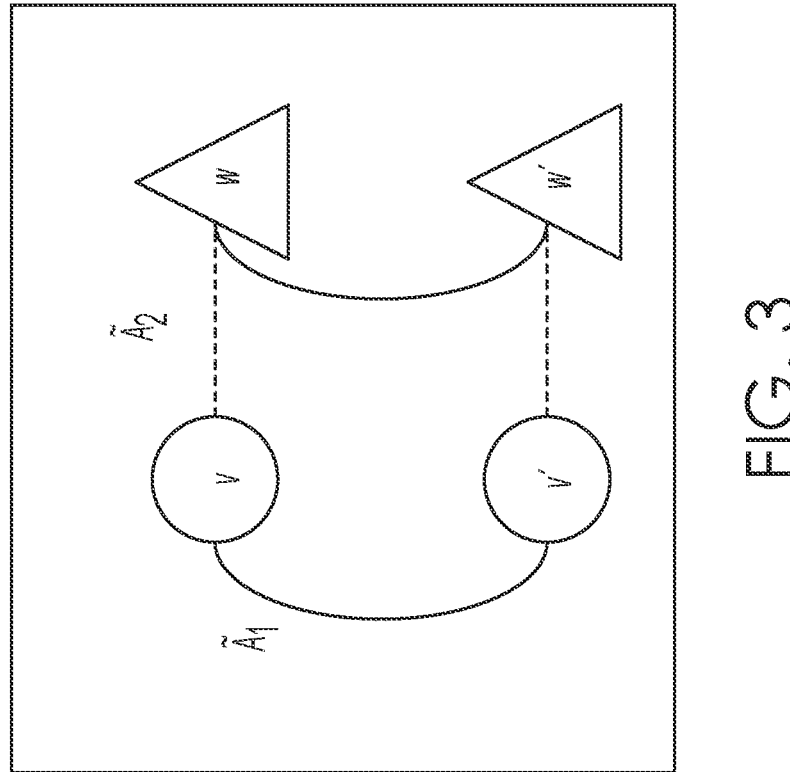
FIG. 3 illustrates in an embodiment of a synergy analysis of tensor graph convolutional layer (TGCL).

In an embodiment, the TGCL can effectively model tensor graphs and capture the synergy among different adjacency matrices. The vector $p=[p_1, \ldots, p_M]\in[0,1]^M$ represents a combination of M networks, where $p_m=1$ and $p_m=0$ respectively indicate the presence and absence of the $\tilde{A}_m$. Therefore, each node in $\chi$ could collect other nodes' information along the adjacency matrix $\tilde{A}_m$ if $p_m=1$. FIG. 3 illustrates in an embodiment synergy analysis of TGCL. For example, suppose M=2 and $p_1=p_2=1$ (as shown in FIG. 3 and Equation (21)), then node $\chi[1,1]$ (node v) could reach node $\chi[2,2]$ (node w') by passing node $\chi[2,1]$ along the adjacency matrix $\tilde{A}_1$ ($\chi\times_1\tilde{A}_1$) and then arriving at node $\chi[2,2]$ via $\tilde{A}_2$ ($\chi\times_1 \tilde{A}_1\times_2\tilde{A}_2$). In contrast, with a traditional GCN layer, node v can only gather information of its direct neighbors from a given model (node v' via $\tilde{A}_1$ or w via $\tilde{A}_2$).

An additional advantage of TGCL lies in that it is robust to missing values in $\chi$ since TGCL is able to recover the value of a node from various combination of adjacency matrices. For example, suppose the value of node v=0, then TGCL could recover its value by referencing the value of v' (via $\chi\times_1\tilde{A}_1$), or the value of w (via $\chi\times_2\tilde{A}_2$), or the value of w' (via $\chi\times_1\tilde{A}_1\times_2\tilde{A}_2$). However, a GCN layer could only refer to the node v' via $\tilde{A}_1$ or w via $\tilde{A}_2$.

Tensor Recurrent Neural Network

Figure 4:
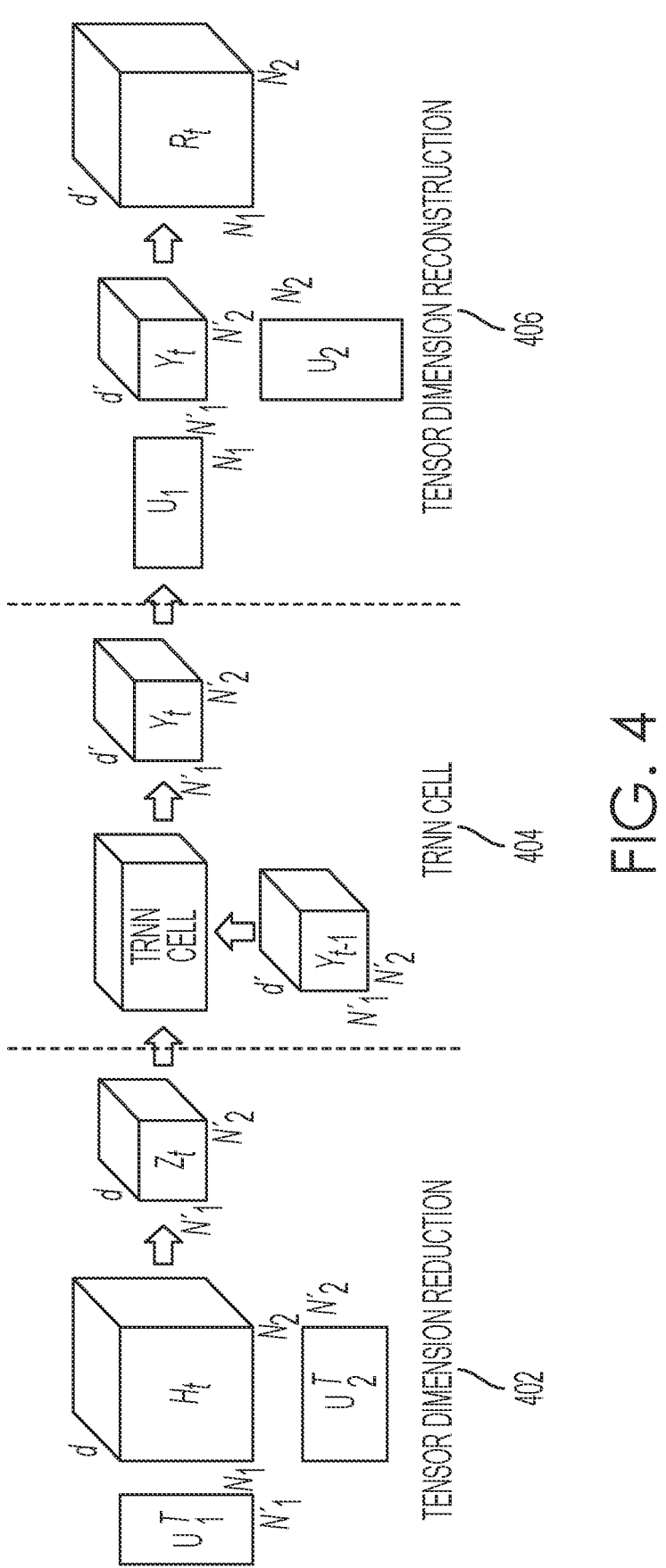
FIG. 4 illustrates tensor recurrent neural network (TRNN) in an embodiment.

In an embodiment, given the output from TGCN: $\mathcal{H}_t\in \mathbb{R}^{N_1\times \cdots \times N_M\times d}$ (Equation (23)), the methodology can incorporate temporal dynamics for $\mathcal{H}_t$. FIG. 4 illustrates Tensor Recurrent Neural Network (TRNN) in an embodiment. As shown in FIG. 4, a Tensor Recurrent Neural Network (TRNN) can capture the implicit relation among co-evolving time series by decomposing $\mathcal{H}_t$ into a low dimensional core tensor $\mathcal{Z}_t\in\mathbb{R}^{N_1\times \cdots \times N_M\times d}$ ($N_m<N_m$) via a Tensor Dimension Reduction module. A Tensor RNN Cell module can further introduce non-linear temporal dynamics into $\mathcal{Z}_t$ and produce the hidden state $\mathcal{Y}_t\in\mathbb{R}^{N_1\times \cdots \times N_M\times d}$. A Tensor Dimension Reconstruction module 406 can reconstruct $\mathcal{Y}_t$ and generate the reconstructed tensor $\mathcal{R}_t\in\mathbb{R}^{N_1\times \cdots \times N_M\times d}$.

Tensor Dimension Reduction

As shown at 402 in FIG. 4, a tensor dimension reduction module in an embodiment reduces the dimensionality of each mode of $\mathcal{H}_t\in\mathbb{R}^{N_1\times \cdots \times N_M\times d}$, for instance, except for the last mode (hidden features), by leveraging Tucker decomposition (Definition 2.7):

$$\mathcal{Z}_t=\mathcal{H}_t\Pi_{m=1}^M\times_m U_m^T \tag{24}$$

where $U_m\in\mathbb{R}^{N_m\times N_m}$ denotes the orthonormal parameter matrix, which is learnable via backpropagation; $\mathcal{Z}_t\in\mathbb{R}^{N_1\times \cdots \times N_m\times d}$ is the core tensor of $\mathcal{H}_t$.

Tensor RNN Cell

Classic RNN cells, e.g. Long-Short-Term-Memory (LSTM) are designed for a single input sequence, and therefore do not directly capture the correlation among co-evolving sequences. To address this problem, in an embodiment, the methodology can implement a Tensor RNN (TRNN) cell 404 based on tensor algebra.

The methodology in an embodiment can provide a Tensor Linear Layer (TLL):

$$\text{TLL}(\chi)=\chi\Pi_{m=1}^{M+1}\times_m W_m+b \tag{25}$$

where $\chi\in\mathbb{R}^{N_1\times \cdots \times N_M\times d}$ is the input tensor, and $W_m\in\mathbb{R}^{N_m\times N_m}$ ($\forall m\in[1, \ldots, M]$) and $W_{M+1}\in\mathbb{R}^{d\times d}$ are the linear transition parameter matrices; $b\in\mathbb{R}^{d}$ denotes the bias vector TRNN can be obtained by replacing the linear functions in any RNN cell with the provided TLL. For example, LSTM can be used as an example to re-formulate its updating equations. By replacing the linear functions in the LSTM with the provided TLL, there are updating functions for Tensor LSTM (TLSTM) (bias vectors are omitted for clarity):

$$\mathcal{F}_t=\sigma(\text{TLL}_{fz}(\mathcal{Z}_t)+\text{TLL}_{fy}(\mathcal{Y}_{t-1})) \tag{26}$$

$$\mathcal{I}_t=\sigma(\text{TLL}_{iz}(\mathcal{Z}_t)+\text{TLL}_{iy}(\mathcal{Y}_{t-1})) \tag{27}$$

$$\mathcal{O}_t=\sigma(\text{TLL}_{oz}(\mathcal{Z}_t)+\text{TLL}_{oy}(\mathcal{Y}_{t-1})) \tag{28}$$

$$\tilde{\mathcal{C}}_t=\tanh(\text{TLL}_{cz}(\mathcal{Z}_t)+\text{TLL}_{cy}(\mathcal{Y}_{t-1})) \tag{29}$$

$$\mathcal{C}_t=\mathcal{F}_t\odot\mathcal{C}_{t-1}+\mathcal{I}_t\odot\tilde{\mathcal{C}}_t \tag{30}$$

$$\mathcal{Y}_t=\mathcal{O}_t\odot\sigma(\mathcal{C}_t) \tag{31}$$

where $\mathcal{Z}_t\in\mathbb{R}^{N_1\times \cdots \times N_M\times d}$ and $\mathcal{Y}_t\in\mathbb{R}^{N_1\times \cdots \times N_M\times d'}$ denote the input core tensor and the hidden state tensor at the time step t; $\mathcal{F}_t, \mathcal{I}_t, \mathcal{O}_t\in\mathbb{R}^{N_1\times \cdots \times N_M\times d'}$ denote the forget gate, the input gate and the output gate, respectively; $\tilde{c}_t\in\mathbb{R}^{N_1\times \cdots \times N_M\times d'}$ is the tensor for updating the cell memory $\mathcal{C}_t\in\mathbb{R}^{N_1\times \cdots \times N_M\times d'}$; $\text{TLL}_*(\bullet)$ denotes the tensor linear layer (Equation 25)), and its subscripts in the above equations are used to distinguish different initialization of TLL (In an embodiment, for instance, for all TLL related to $\mathcal{Z}_t$: $\text{TLL}_{*z}(\bullet)$, $W_m\in\mathbb{R}^{N_m\times N_m}$ ($\forall m\in[1, \ldots, M]$) and $W_{M+1}\in\mathbb{R}^{d\times d'}$. For all TLL related to $\mathcal{Y}_{t-1}$: $\text{TLL}_{*y}(\bullet)$, $W_m\in\mathbb{R}^{N_m\times N_m}$ ($\forall m\in[1, \ldots, M]$) and $W_{M+1}\in\mathbb{R}^{d'\times d'}$); $\sigma(\bullet)$ and $\tanh(\bullet)$ denote the sigmoid activation and tangent activation functions respectively; $\odot$ denotes the Hadamard product.

Tensor Dimension Reconstruction

In an embodiment, to predict the values of each time series, the methodology can reconstruct the dimensionality of each mode. Using the orthonormality of $U_m$ ($\forall m\in[1, \ldots, M]$), the methodology in an embodiment can reconstruct the dimensionality of $\mathcal{Y}_t\in\mathbb{R}^{N_1\times \cdots \times N_M\times d'}$ as follows:

$$\mathcal{R}_t=\mathcal{Y}_t\Pi_{m=1}^M\times_m U_m \tag{32}$$

where $\mathcal{R}_t\in\mathbb{R}^{N_1\times \cdots \times N_M\times d'}$ is the reconstructed tensor. Tensor dimension reconstruction is shown at 406 in an embodiment.

Implicit Relationship

In an embodiment, the Tucker decomposition (Definition 2.7 and Equation (24)) can be regarded as high-order principal component analysis. The matrix $U_m$ extracts eigenvectors of the m-th mode, and each element in $\mathcal{Z}$ indicates the relation between different eigenvectors. The methodology in an embodiment can define $\rho\geq0$ as the indicator of interaction degree, such that $N'_m=\rho N_m$ ($\forall m\in[1, \ldots, M]$), to represent to what degree does the TLSTM capture the correlation. In an embodiment, a range for $\rho$ is (0,1). When $\rho=0$, the TLSTM does not capture any relations and it is reduced to a single LSTM. When $\rho=1$, the TLSTM captures the relation for each pair of the eigenvectors. When $\rho>1$, the $U_m$ is over-complete and contains redundant information.

In an aspect, despite the dimensionality reduced by Equation (24), it may be that there is not a guarantee that the number of parameters in TLSTM will always be less than the number of parameters in multiple separate LSTMs, because of the newly introduced parameters $U_m$ ($\forall m\in[1, \ldots, M]$). The following lemma provides an upper-bound for $\rho$ given the dimensions of the input tensor and the hidden dimensions.

Lemma 3.5 (Upper-bound for $\rho$). Let $N_m$ and $N'_m$ be the dimensions of $U_m$ in Equation (24), and let $d\in\mathbb{R}$ and $d'\in\mathbb{R}$ be the hidden dimensions of the inputs and outputs of TLSTM. TLSTM uses less parameters than multiple separate LSTMs, for example, as long as the following condition holds:

$$\rho \le \sqrt{\frac{\left(\prod_{m=1}^{M} N_m - 1\right)d'(d + d' + 1)}{2\sum_{m=1}^{M} N_m^2} + \frac{1}{256}} - \sqrt{\frac{1}{256}} \qquad (33)$$

Proof. There are totally $\prod_{m=1}^{M} N_m$ time series in the tensor time series $\mathcal{S} \in \mathbb{R}^{N_1 \times \cdots \times N_M \times T}$, and thus the total number of parameters for $\prod_{m=1}^{M} N_m$ separate LSTM is:

$$N^{(LSTM)} = \prod_{m=1}^{M} N_m[4(dd' + d'd' + d')] \qquad (34)$$
$$= 4d'(d + d' + 1)\prod_{m=1}^{M} N_m$$

The total number of parameters for the TLSTM is:

$$N^{(TLSTM)} = 4d'(d + d' + 1) + 8\Sigma_{m=1}^{M} N'_m{}^2 + \Sigma_{m=1}^{M} N'_m N_m \qquad (35)$$

where the first two terms on the right side are the numbers of parameters of the TLSTM cell, and the third term is the number of parameters required by $\{U_m\}_{m=1}^{M}$ in the Tucker decomposition.

Let $\Delta = N^{(TLSTM)} - N^{(LSTM)}$, and let's replace $N'_m$ by $\rho N_m$, then there can be:

$$\Delta = (8\rho^2 + \rho)\Sigma_{m=1}^{M} N_m{}^2 - 4(\prod_{m=1}^{M} N_m - 1)d'(d + d' + 1) \qquad (36)$$

$\Delta$ is a convex function of $\rho$. Hence, in an embodiment, if $\rho$ satisfies the condition specified in the following equation, it can be ensured that the number of parameters is reduced.

$$\rho \le \sqrt{\frac{\left(\prod_{m=1}^{M} N_m - 1\right)d'(d + d' + 1)}{2\sum_{m=1}^{M} N_m^2} + \frac{1}{256}} - \sqrt{\frac{1}{256}} \qquad (37)$$

Output Module

In an embodiment, the methodology can use a Multi-Layer Perceptron (MLP) with a linear output activation as the output module (e.g., shown at 112, FIG. 1):

$$\hat{\mathcal{S}}_{t+1} = MLP([\mathcal{H}_t, \mathcal{R}_t]) \qquad (38)$$

where $\hat{\mathcal{S}}_{t+1} \in \mathbb{R}^{N_1 \times \cdots \times N_M}$ represents the predicted snapshot; $\mathcal{H}_t$ and $\mathcal{R}_t$ are the outputs of TGCN and TRNN respectively; and $[\cdot]$ denotes the concatenation operation.

Training

In an embodiment, training RNNs can include partitioning the time series data by a certain (e.g., predefined or configured) window size with $\omega$ historical steps and $\tau$ future steps. Given a time step t, let $\{\mathcal{S}_{t'}\}_{t'=t-\omega+1}^{t}$ and $\{\mathcal{S}_{t'}\}_{t'=t+1}^{t+\tau}$ be the historical and the future slices, the objective function of one window slice can be defined as:

$$\arg\min_{\Theta, W, b} \left\| NeT(\{S_{t'}\}_{t'=t-\omega+1}^{t}) - \{S_{t'}\}_{t'=t+1}^{t+\tau} \right\|_F^2 + \qquad (39)$$
$$\mu_1 \sum_{t'=t-\omega+1}^{t} \left\| \mathcal{H}_{t'} - \mathcal{Z}_{t'} \prod_{m=1}^{M} \times_m U_m \right\|_F^2 +$$
$$\mu_2 \sum_{m=1}^{M} \left\| U_m U_m^T - I_m \right\|_F^2$$

where NeT denotes a network of tensor time series model, for example, described herein; $\Theta$ and $\mathcal{W}$ represent the parameters of TGCN and TRNN respectively; b denotes the bias vectors; the second term denotes the reconstruction error of the Tucker decomposition; the third term denotes the orthonormality regularization for $U_m$, and $I_m$ denotes identity matrix ($\forall m \in [1, \ldots, M]$); $\|\cdot\|_F$ is the Frobenius norm; $\mu_1$ and $\mu_2$ are coefficients.

In one or more embodiment, the NeT can recover missing values and predict future values in time series, e.g., co-evolving tensor time series. In one or more embodiments, the TGCN can help improve the overall performance of NeT. In one or more embodiments, the interaction degree $\rho$ can impact the performance of NeT.

Figure 5:
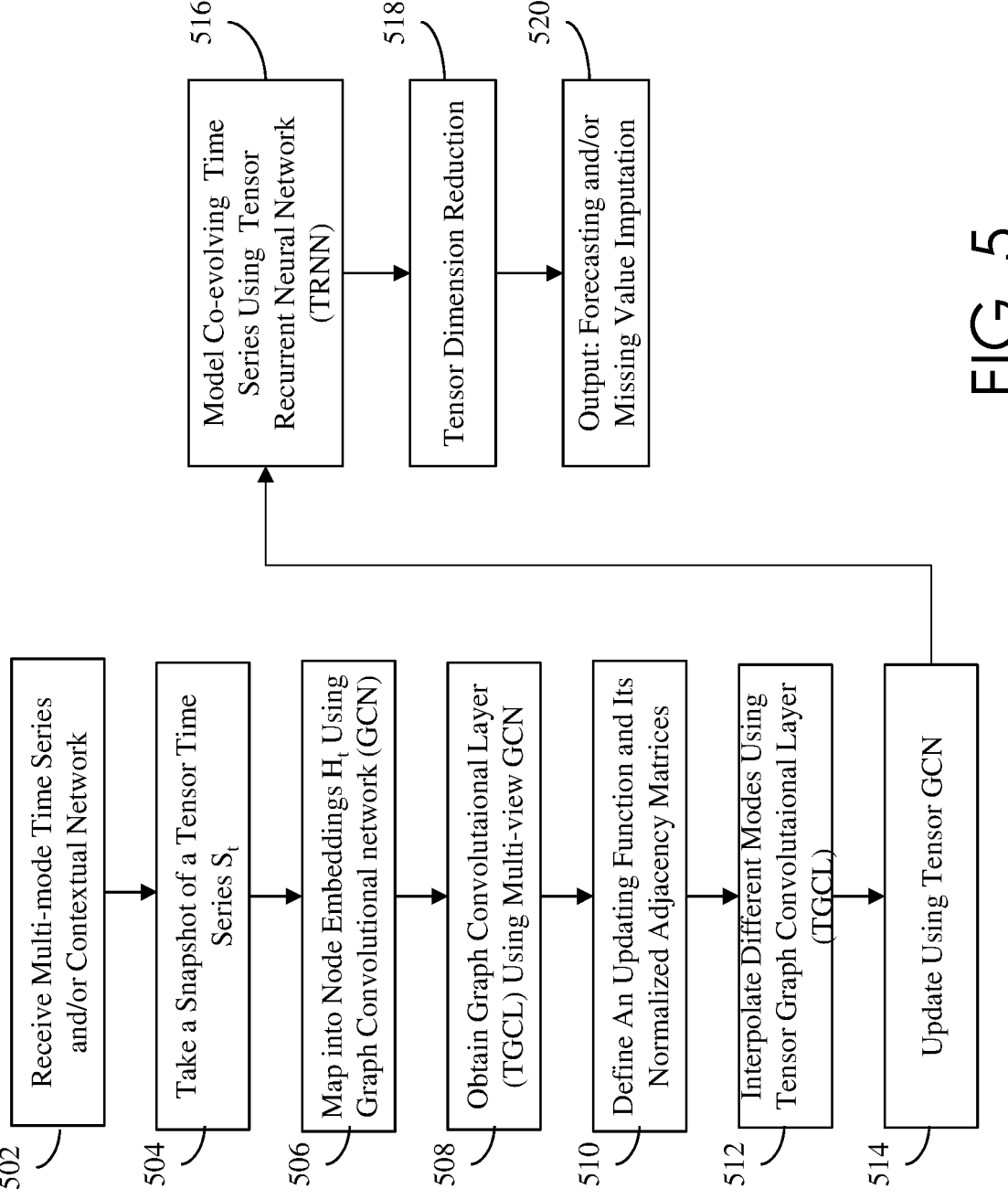
FIG. 5 is a flow diagram illustrating a method in an embodiment.

FIG. 5 is a flow diagram illustrating a method in an embodiment. The method can be implemented by or run on one or more computer processors, for example, including one or more hardware processors. At 502, multi-mode time series and/or contextual network can be received. Such data can be received or obtained from a database, for example, stored on a storage device.

At 504, a snapshot of a tensor time series, $S_t$, e.g., data at time t is taken. Tensor time series can include multi-mode time series.

At 506, using graph convolution network (GCN), node embeddings, $H_t$, are mapped. For example, node embeddings can be mapped by applying an activation function such as the Rectified Linear Unit (ReLU) to GCN. In an embodiment, a pooling function such as average pooling can be applied to GCNs of multiple modes.

At 508, using multi-view GCN (e.g., an ensemble of multiple independent GCNs, e.g., each GCN representing a different mode of a co-evolving time series), as ills trusted in Eq. (22) above Tensor Graph Convolutional Layer (TGCL) is obtained.

At 510, an updating function and normalized adjacency matrices are defined. For example, an updating function can be one shown in Eq. (22) above. Adjacency matrices, for example, specify relationships between or among GCNs, e.g., different modes of co-evolving time series.

At 512, different modes of tensor time series can be interpolated using tensor convolution layer. For example, as described above, TGCL can effectively model tensor graphs and capture the synergy among different adjacency matrices. The vector $p = [p_1, \ldots, p_M] \in [0,1]^M$ represents a combination of M networks, where $p_m = 1$ and $p_m = 0$ respectively indicate the presence and absence of the $\tilde{A}_m$. Each node in $\chi$ may collect other nodes' information along the adjacency matrix $\tilde{A}_m$ if $p_m = 1$. TGCN, for example, can capture the synergy among different networks.

At 514, node embeddings, $H_t$, can be updated using tensor graph convolution network (TGCN). For example, $H_t$, can be obtained as described above with respect to tensor graph convolution network and Tensor Graph Convolutional Layer and Eqs. (22) and (23). Filters for each mode can be applied to generate node embedding, $H_t$.

At 516, the co-evolving time series can be modeled using TRNN, for example, as described above. TRNN incorporates temporal dynamics of $H_t$, and can generate $R_t$, a tensor that incorporates temporal dynamics of $H_t$. TRNN can capture the temporal dynamics of multiple time series and also can reduce the number of parameters.

At 518, tensor dimension reduction can be performed to reduce the dimensionality of each mode of $H_t$. Tensor dimension reduction is described above, in an embodiment, in detail. The TRNN output $R_t$, a reconstructed tensor, for example, as described above.

At 520, an output module can provide forecasting and/or missing value imputation. An embodiment of the output module is described above with reference to Eq. (38). An example of the output module can be a multi-layer perceptron (MLP). The output module takes $H_t$ and $R_t$ as input and provide a predicted snapshot. The predicted snapshot, for example, can include missing value imputation. In an embodiment, the output model can provide missing values, for example, using the node embeddings generated by TGCN.

By way of practical example, a real-world dataset or times series representing environmental data in an environment, for example, a laboratory setting, can be used to build the network of tensor time series. The real-world dataset can include a collection of reading log from 54 sensors deployed in the environment. For instance, each sensor collects 4 types of data, i.e., temperature, humidity, light, and voltage. There can be 2880 time steps in total, yielding a 54×4×2880 tensor time series. In an embodiment, the average connectivity of each pair of sensors can be used to construct the network for the first mode (54 sensors). In an embodiment, for the network of four data types, the Pearson correlation coefficient between each pair of them can be use:

$$A[i,j] = \frac{1}{2}(r_{ij}+1) \tag{40}$$

where $r_{ij} \in [-1,1]$ denotes the Pearson correlation coefficient between the sequence i and the sequence j.

Another practical example can include soil dataset, for example, from soil sensors, containing one-year log of water temperature and volumetric water content collected from 42 locations and 5 depth levels in a location. This data can form a 42×5×2×365 tensor time series. In this example dataset, the dataset neither provides the specific location information of sensors nor the relation between the water temperature and volumetric water content. In an embodiment, the experiment can use Pearson correlation, as shown in Equation (40), to build the adjacency matrices for all the modes.

Yet another practical example can include revenue dataset, including an actual and two estimated quarterly revenues for 410 major companies from the first quarter of year xx04 to the second quarter of xx19, which yields a 410×3× 62 tensor time series. In an embodiment, correlation among different companies can be used as the adjacency matrix for the first mode. The experiment can use the Pearson correlation coefficient to construct the adjacency matrix for the three revenues.

Still another practice example can include traffic dataset. For example, hourly average speed and occupancy of 1,000 randomly chosen sensor stations in a district collected during a time period covering 1440 hrs (about 60 days), yields a 1000×2×1440 tensor time series. The adjacency matrix $A_1$ for the first mode is constructed by indicating whether two stations are adjacent: $A_1[i, j]=1$ represents the stations i and j are next to each other. For the second mode, in case the Pearson correlation between speed and occupancy is not significant, the experiment can use identity matrix I as the adjacency matrix.

Another practical example dataset can include oceanic and atmospheric data. For example, dataset, which covers a 30×30 area of north America, ranging from 30° N to 60° N, 80° W to 110° W, and containing 20 atmospheric pressure levels. For each of the location point, 6 attributes can be used, including air temperature, specific humidity, omega, u wind, v wind and geo-potential height. The experiment can use the monthly average data in a period of time covering 180 months. The shape of the example data can be 30×30× 20×6×180. In an embodiment, the adjacency matrix $A_1$ for the first mode, latitude, is constructed by indicating whether two latitude degrees are next to each other: $A_1[i, j]=1$ if i and j are adjacent. In an embodiment, the adjacency matrices $A_2$ and $A_3$ for the second and the third modes are built in the same way as $A_1$. In an embodiment, the experiment can build $A_4$ for the 6 attributes based on Equation (40).

An example implementation detail can include, but not limited to, for the dataset, one layer TGCN, one layer TLSTM, and one layer MLP with the linear activation. The hidden dimension can be fixed as 8. In an embodiment, an implementation may fix $\rho=0.8$, 0.8, 0.2, 0.1 and 0.9 for TLSTM on above example environment dataset, soil dataset, revenue dataset, traffic dataset, and atmospheric dataset, respectively. The window size can be set as $\omega=5$ and $\tau=1$, and Adam optimizer with a learning rate of 0.01 can be adopted. Coefficients $\mu_1$ and $\mu_2$ can be fixed as $10^{-3}$. The above implementation configurations are provide as examples only. Other configurations can be used to implement the network of tensor time series.

Experimental results show that the disclosed system and method can provide improvements in recovering missing values and predicting future values of time series, e.g., co-evolving time series. For example, experimental results illustrate that a network of tensor time series model can outperform existing methods. TGCN can capture various synergy among graphs. TGCN can also achieve lower error, e.g., root mean square error (RMSE) than existing methods. TLSTM or TRNN can capture implicit relations effectively. The network of tensor time series model can capture the non-linearity in the temporal dynamics.

Experiment results also show significant memory efficiency. For example, TLSTM or TRNN reduces the number of parameters by more than 80% and yet performs better than separate LSTMs. Training time for the machine learning models or neural network models are reduced, for instance, resulting in faster training. TLSTM, for example, reduces computer memory usage compared to separate LSTMs. The network of tensor time series model is also scalable in terms of the training time and the number of parameters.

A network of tensor time series model, in an embodiment, jointly models tensor time series with its relation networks. In an embodiment, to model the tensor with its relation networks at each time step, a methodology generalizes the graph convolution from flat graphs to tensor graphs and provides a TGCN, for example, which can capture the synergy among graphs, and/or has a succinct form. A TRNN, in an embodiment, balances the commonality and specificity of the co-evolving time series, which helps reduce noise in the data and the number of parameters in the model. Experiments on a variety of real-world datasets demonstrate the efficacy and the applicability of the network of tensor time series.

Figure 6:
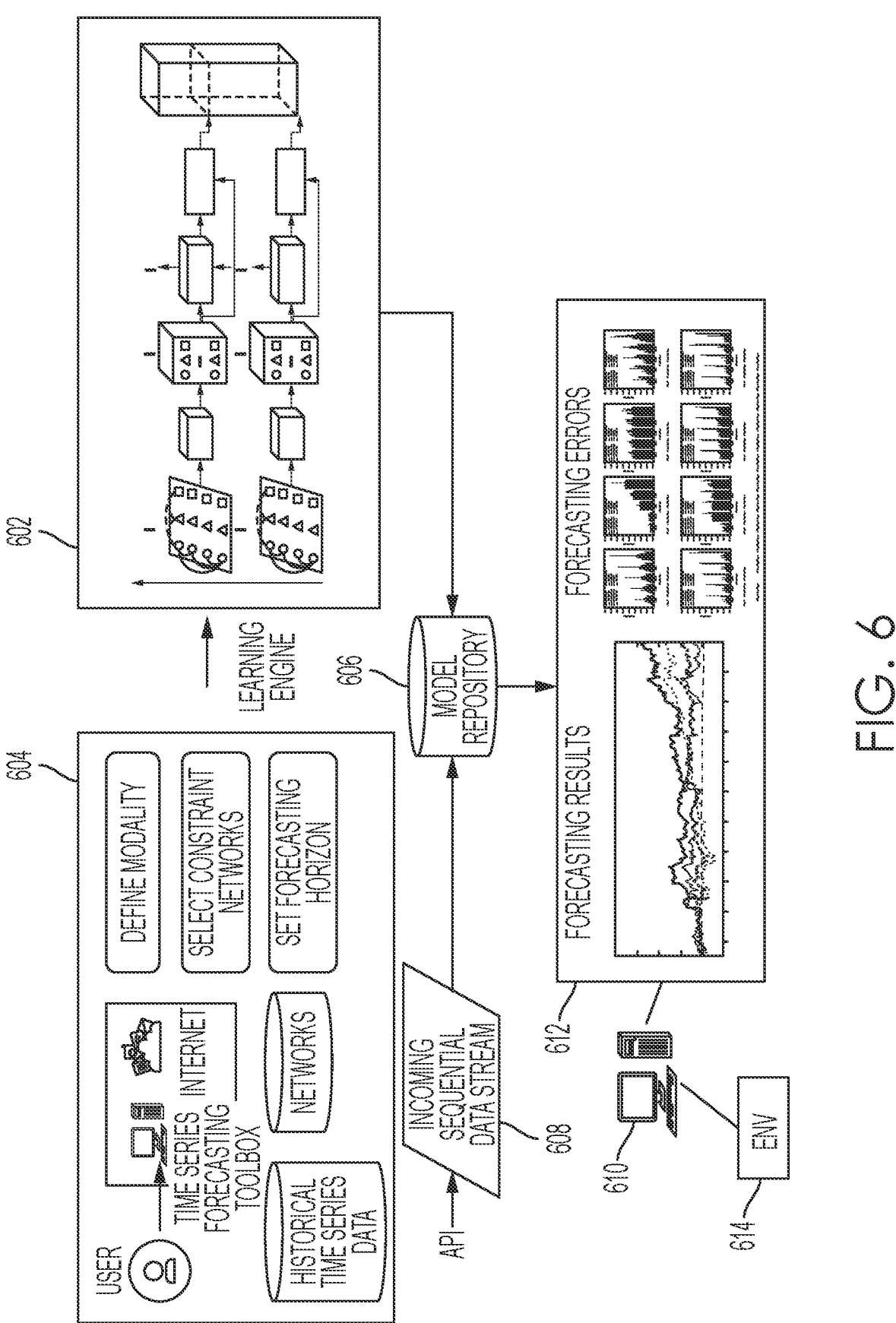
FIG. 6 is a diagram illustrating components of a system in an embodiment.

FIG. 6 is a diagram illustrating components of a system in an embodiment. The components shown include computer-implemented components, for instance, implemented and/or run on one or more hardware processors. A network of tensor time series model 602 (e.g., shown also in FIG. 1) can be trained, for example, as described above. For example, a computer system 604, such as but not limited to a client or user computer, can train such a model 602. The computer system 604, for example, can be running a user interface tool, via which a user may initiate the training, for example, providing user input or configuration, such as historical time series data and networks to use as training set, defining modality, selecting constraint networks, and/or setting forecasting horizon. In an embodiment, the computer system 604 may utilize the tool, e.g., via an internet (and/or intranet), to train the model 602.

A repository 606, e.g., on a storage device or memory device, can store the trained model. The trained model can be run, for example, with new or incoming sequential data stream of time series data 608. For instance, an application programming interface (API) may interface with a data source for streaming in time series data 608. Such API can be run from the computer system 604 or another computer system or device. The trained model can predict forecasting results. The results produced by the model can be visualized as shown at 612 on a computer system 610, for example, the computer system 610 can be the same computer system shown at 604 or another computer system. A graphical user interface, for example, can provide a display of visualization 612, for example, which can include plotted graphs of time series, including future predictions, bar charts of confidence values or error margins in forecasting, and/or others.

In an embodiment, based on the trained model's prediction or forecast, one or more environment variables or settings 614 can be controlled. For example, a computer system 610, based on the trained model's predicted result, may automatically control one or more sensors or machinery that changes the environment setting, such as controlling a thermostat to raise or lower temperature in an area.

For example, environmental monitoring can include the following. An area or room comfortable-level controller can collect time series data from a network of smart wireless Internet of Things (IoT) sensors that belong to different modes. An example of one mode is location and another mode is sensor type, such as temperature, humidity, light and voltage. A constraint network can be learned by temporal time series correlation. Based on the collected network of time series data and a trained model in the controller, the controller can forecast the environment comfortable indicators in the next time horizon. Based on the forecasting results, the controller can adjust the system, such as heating, air condition, humidifier or dehumidifier, lights, and/or others, accordingly to achieve the set comfortable level.

Another example can include smart transportation. A routing advisor or automatic driving routing controller (e.g., a hardware processor or a machine), or the like, can collect time series data from a network of traffic sensor stations (e.g., 1000 stations on the road network) associated with hourly average speed and occupancy. The network constraints can be learned by temporal time series correlation. Based on the collected network of time series data and a trained model in the advisor/controller, the advisor/controller can automatically or autonomously forecast the traffic in the next time horizon and advise a new routing.

Another example can include financial time series. Multiple modes associated with features extracted from different data sources can include weather, financial news, financial market, financial filings, transactions, and/others. Constraint networks can be financial knowledge graphs. A computer-implemented financial toolkit can be implemented with ability to train and run a network of tensor time series model. Such financial toolkit can also include an API that streams in financial time series. Forecasting results by the trained model can support one or more decisions for banking and/or financial market, such as but not limited to, portfolio optimization.

Figure 7:
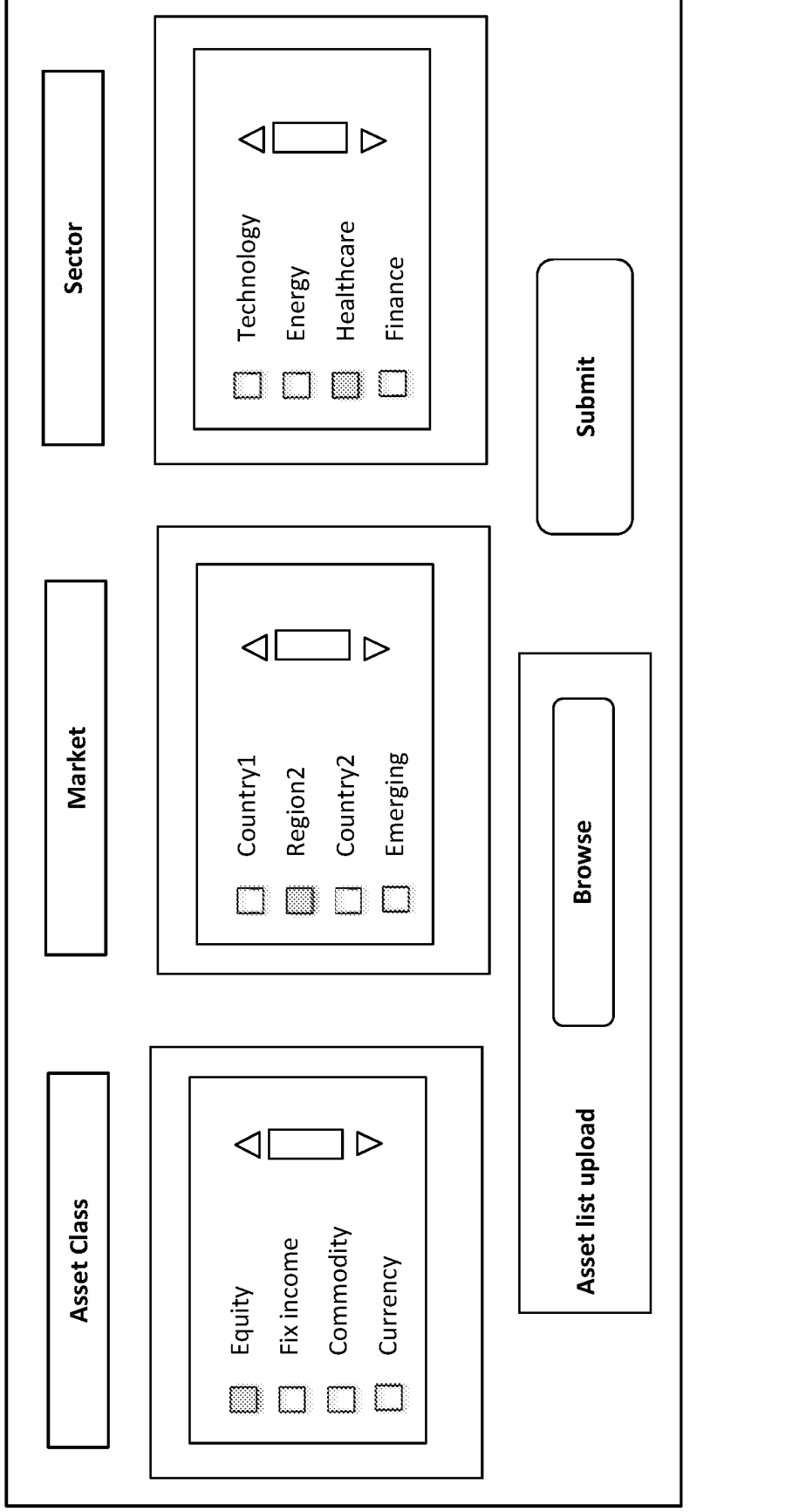
FIG. 7 is a diagram illustrating an example user interface screen display for using a network of tensor time series model in an embodiment.

FIG. 7 is a diagram illustrating an example user interface screen display for using a network of tensor time series model in an embodiment. Using the user interface, a user may select and/or configure the type of data the network of tensor time series model would use in its learning and/or forecasting. The model can provide results for optimal portfolio, its performance and/or return prediction. Such results can be provided graphically via a user interface.

Figure 8:
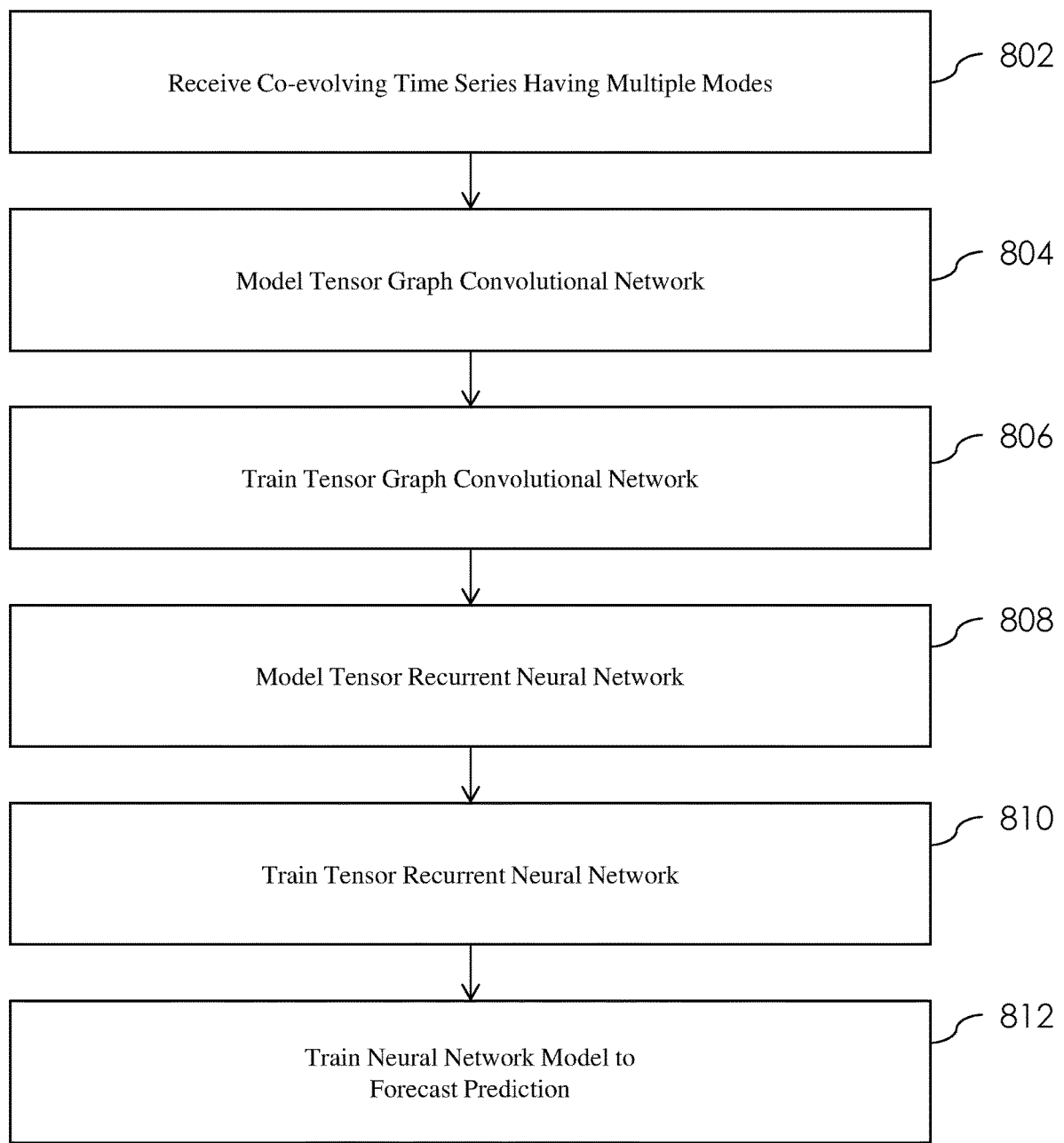
FIG. 8 is a flow diagram illustrating a method in an embodiment.

FIG. 8 is a flow diagram illustrating a method in an embodiment. The method can be implemented by or run on one or more hardware processors. At 802, co-evolving time series having multiple modes can be received. In an embodiment, a mode can also include multiple data types. At 804, a tensor graph convolutional network can be modeled, configured, structured or built, that incorporates the multiple modes and relationships of the multiple modes. In an embodiment, the relationships can be represented as adjacency matrices. In an embodiment, there can be an adjacency matrix per mode. At 806, the tensor graph convolutional network can be trained to generate node embeddings associated with a snapshot of the co-evolving time series at time t. For example, node embeddings can be generated by convolving the snapshot, e.g., applying one or more filters to the snapshot of the co-evolving time series and associated adjacent matrices. In an embodiment, imputation of missing values in the co-evolving time series can be performed based on the node embeddings.

In an embodiment, a method can include modeling, configuring or structuring a tensor recurrent neural network, e.g., shown at 808. At 810, the method can include training the tensor recurrent neural network to generate temporal dynamics associated with the co-evolving time series based on the generated node embeddings. In an embodiment, the tensor recurrent neural network can be structured to reduce dimensionality of the generated node embeddings. In an embodiment, the tensor recurrent neural network can include a tensor long short-term memory.

In an embodiment, at 812 a method can include training a neural network model to forecast a prediction for the co-evolving time series based on node embeddings and temporal dynamics, for example, generated by a tensor graph convolutional network and a tensor recurrent neural network. In an embodiment, the neural network model can include a multi-layer perceptron.

By way of example, the co-evolving time series can include sensor data from an environment and the neural network model can be trained to forecast a future value associated with at least one factor in the environment. By way of another example, the co-evolving time series can include traffic data associated with an area and the neural network model is trained to forecast future traffic in the area. By way of yet another example, the co-evolving time series can include financial time series and the neural network model can be trained to forecast future financial portfolio performance.

In an embodiment, a method can include running the trained tensor graph convolutional network, the trained tensor recurrent neural network and the trained neural network using input time series data. In an embodiment, the input time series data can include environment data and the neural network can forecast future environment factors. The method can further include, based on the forecasted future environment factors, controlling a controller that changes at least one of the environment factors, for example, automatically or autonomously controlling a thermostat to control the temperature of the room.

In an embodiment, the input time series data can include traffic data associated with an area and the neural network can forecast future traffic associated with the area. The method can also include, based on the forecasted future traffic, causing a vehicle, such as an autonomous self-driving or semi-automatic type vehicle or another vehicle, to change a route of travel. The method can also include, based on the forecasted future traffic, controlling a traffic routing or navigation application to suggest routes, for example, by displaying or vocalizing via voice synthesis such alternative or different routes. A user, for example, of the application, can be notified of the anticipated traffic and suggestions.

In an embodiment, a method can include modeling a network of tensor time series model which includes a tensor graph convolutional network, a tensor recurrent neural network and a neural network and jointly training the tensor graph convolutional network, the tensor recurrent neural network and the neural network.

Figure 9:
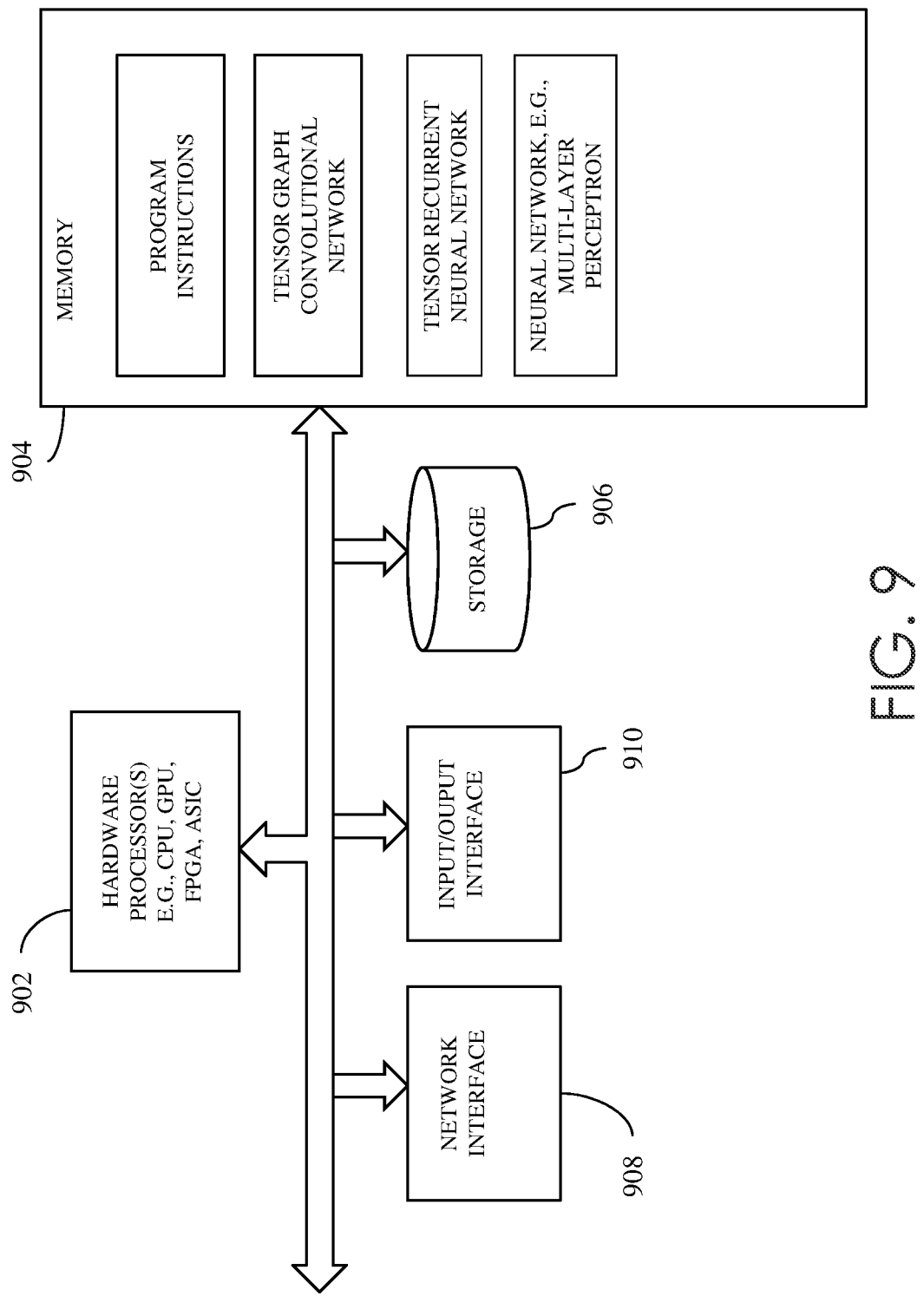
FIG. 9 is a diagram showing components of a system in an embodiment that can implement techniques described herein, for example, for machine learning for a network of tensor time series, and/or machine learning for forecasting and imputation of missing values in time series.

FIG. 9 is a diagram showing components of a system in an embodiment that can implement techniques described herein, for example, for machine learning for a network of tensor time series, and/or machine learning for forecasting and imputation of missing values in time series. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904, and generate and/or run a prediction model such as a network of tensor time series model, forecast predictions, provide recommendations, perform imputation of missing values in time series, and/or control other devices, e.g., based on forecasted predictions. A memory device 904 may include random access memory (RAM), read-only memory (ROM) or another memory device, and may store data and/or processor instructions for implementing various functionalities associated with the methods and/or systems described herein. One or more processors 902 may execute computer instructions stored in memory 904 or received from another computer device or medium. A memory device 904 may, for example, store instructions and/or data for functioning of one or more hardware processors 902, and may include an operating system and other program of instructions and/or data. One or more hardware processors 902 may receive input such as time series, for example, having multiple modes. At least one hardware processor 902 may generate a prediction model, for example, as described herein, using a machine learning technique and/or other techniques. In an aspect, time series data may be stored in a storage device 906 or received via a network interface 908 from a remote device, and may be temporarily loaded into a memory device 904 for building or generating the prediction model. The learned prediction model may be stored on a memory device 904, for example, for running by one or more hardware processors 902. One or more hardware processors 902 may be coupled with interface devices such as a network interface 908 for communicating with remote systems, for example, via a network, and an input/output interface 910 for communicating with input and/or output devices such as a keyboard, mouse, display, and/or others.

Figure 10:
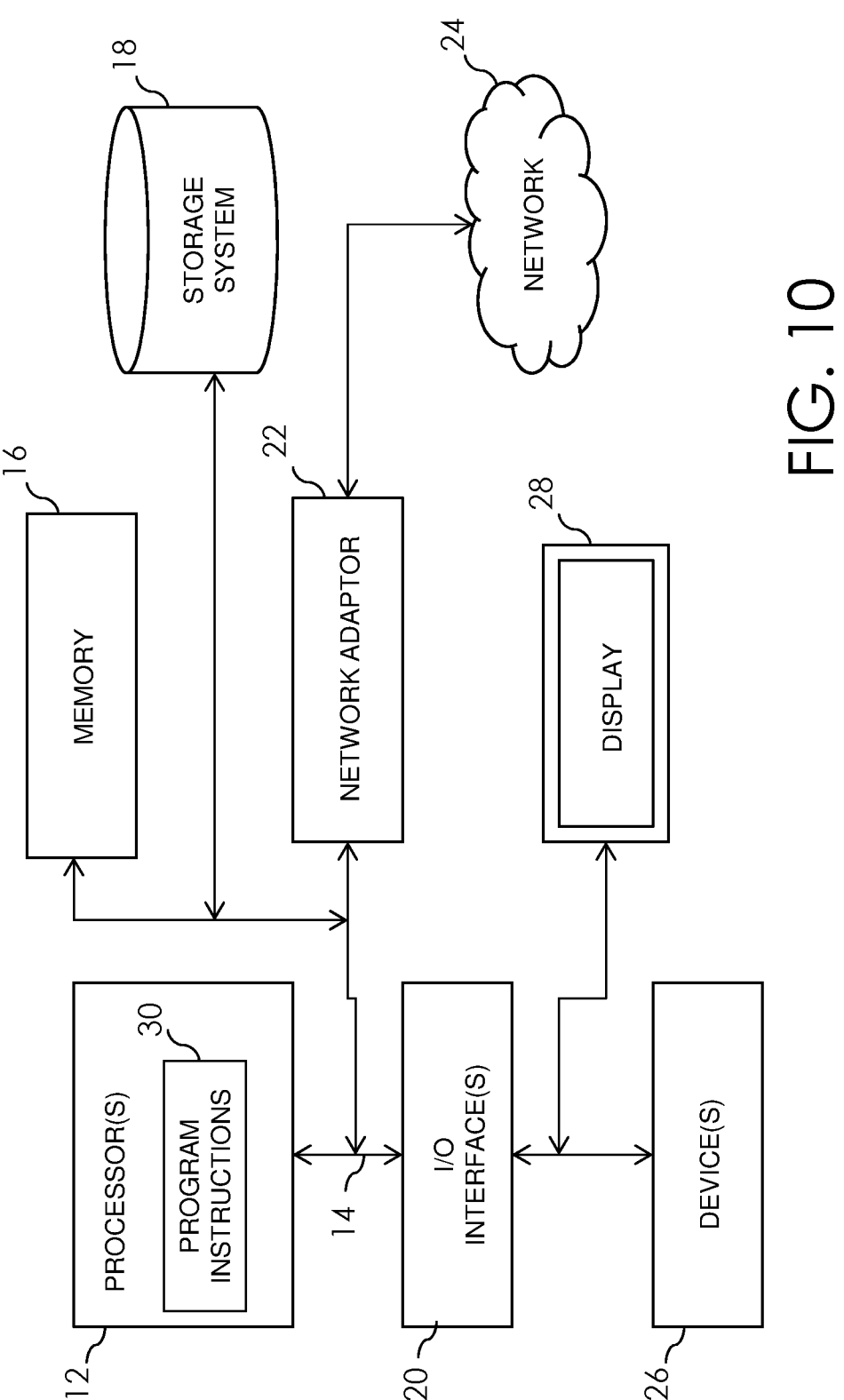
FIG. 10 illustrates a schematic of an example computer or processing system that may implement a system in one embodiment.

FIG. 10 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
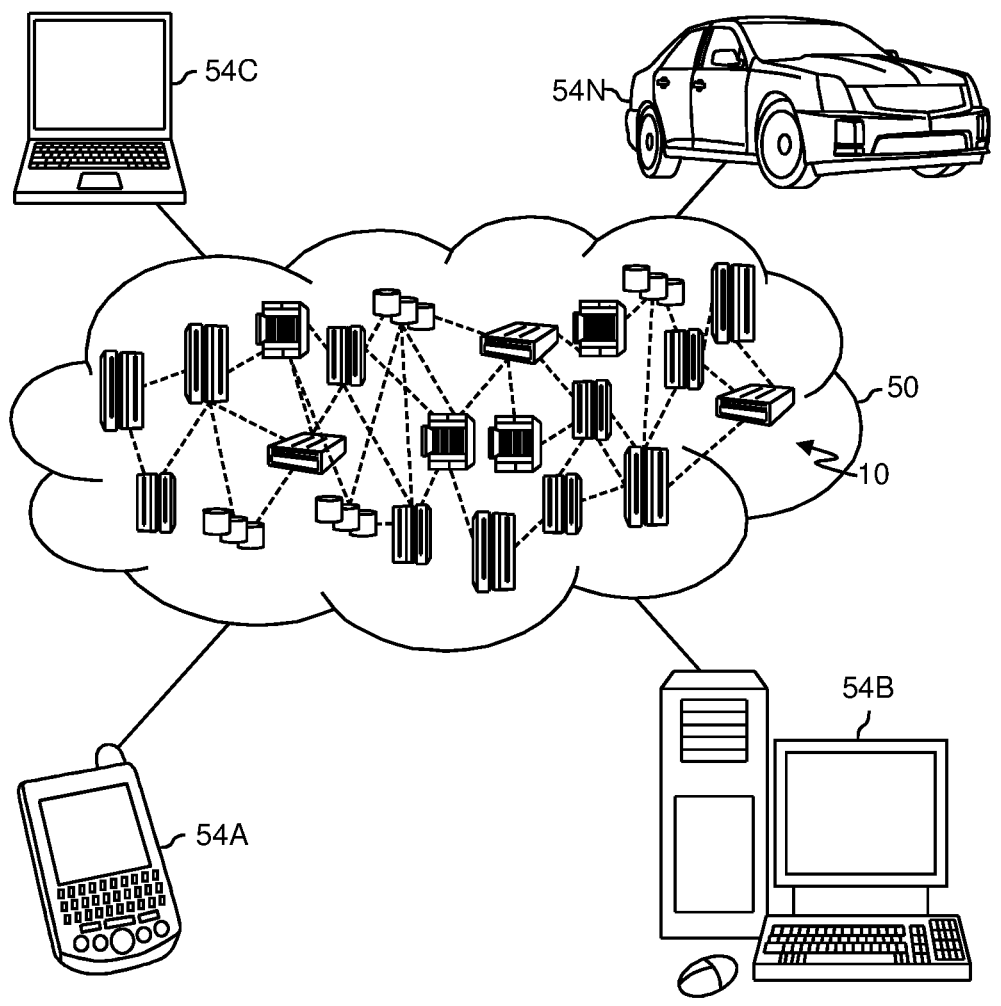
FIG. 11 illustrates a cloud computing environment in one embodiment.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
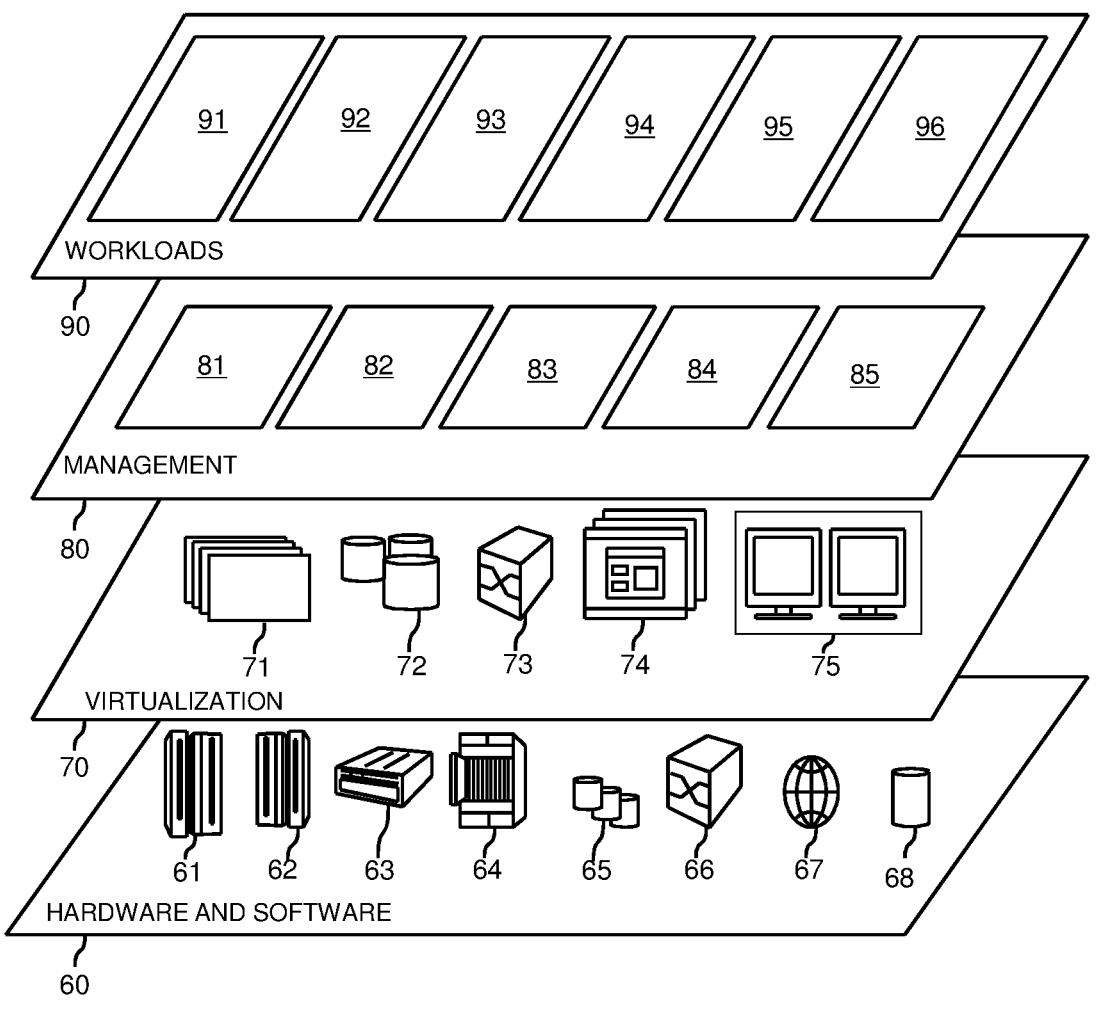
FIG. 12 illustrates a set of functional abstraction layers provided by cloud computing environment in one embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tensor time series processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   receiving co-evolving time series having multiple modes, different modes of the multiple modes having different relationships between the multiple modes;
   structuring a tensor graph convolutional network that incorporates the multiple modes and relationships of the multiple modes;
   training the tensor graph convolutional network to generate node embeddings associated with a snapshot of the co-evolving time series at time t;
   structuring a tensor recurrent neural network;
   training the tensor recurrent neural network to generate temporal dynamics associated with the co-evolving time series based on the generated node embeddings, the tensor recurrent neural network modeling relationship between the temporal dynamics, wherein a degree of the modeled relationship is preconfigurable; and
   training a neural network model to forecast a prediction for the co-evolving time series based on the generated node embeddings and the generated temporal dynamics, the neural network model being a multi-layer perceptron;
   wherein at each time step, a snapshot from a tensor time series is input to the tensor graph convolutional network to generate a node embedding tensor, the tensor graph convolutional network jointly modeling the tensor time series by simultaneously performing convolution on multiple independent graph convolutional networks representing the co-evolving time series having multiple modes to capture synergy between the multiple modes of the co-evolving time series, the generated node embedding tensor is fed into the tensor recurrent neural network to generate encoded temporal dynamics, and hidden states of the tensor recurrent neural network and the generated node embedding tensor are input to the neural network model to predict a snapshot of a next time step.

2. The method of claim 1, further including imputing missing values in the co-evolving time series based on the node embeddings.

3. The method of claim 1, wherein the tensor recurrent neural network is structured to reduce dimensionality of the generated node embeddings.

4. The method of claim 1, wherein the tensor recurrent neural network includes a tensor long short-term memory.

5. The method of claim 1, wherein the co-evolving time series includes sensor data from an environment and the neural network model is trained to forecast a future value associated with at least one factor in the environment.

6. The method of claim 1, wherein the co-evolving time series includes traffic data associated with an area and the neural network model is trained to forecast future traffic in the area.

7. The method of claim 1, wherein the co-evolving time series includes financial time series and the neural network model is trained to forecast future financial portfolio performance.

8. The method of claim 1, further including running the trained tensor graph convolutional network, the trained tensor recurrent neural network and the trained neural network using input time series data.

9. The method of claim 8, wherein the input time series data includes environment data and the neural network forecasts future environment factors, and the method further includes, based on the forecasted future environment factors, controlling a controller that changes at least one of the environment factors.

10. The method of claim 8, wherein the input time series data includes traffic data associated with an area and the neural network forecasts future traffic associated with the area, and the method further includes, based on the forecasted future traffic, causing a vehicle to change a route of travel.

11. A system comprising:
a hardware processor;
a memory device coupled with the hardware processor;
the hardware processor configured to at least:
    receive co-evolving time series having multiple modes, different modes of the multiple modes having different relationships between the multiple modes;
    structure a tensor graph convolutional network that incorporates the multiple modes and relationships of the multiple modes;
    train the tensor graph convolutional network to generate node embeddings associated with a snapshot of the co-evolving time series at time t;
    structure a tensor recurrent neural network;
    train the tensor recurrent neural network to generate temporal dynamics associated with the co-evolving time series based on the generated node embeddings, the tensor recurrent neural network modeling relationship between the temporal dynamics, wherein a degree of the modeled relationship is preconfigurable; and
    train a neural network model to forecast a prediction for the co-evolving time series based on the generated node embeddings and the generated temporal dynamics, the neural network model being a multi-layer perceptron;
    wherein at each time step, a snapshot from a tensor time series is input to the tensor graph convolutional network to generate a node embedding tensor, the tensor graph convolutional network jointly modeling the tensor time series by simultaneously performing convolution on multiple independent graph convolutional networks representing the co-evolving time series having multiple modes to capture synergy between the multiple modes of the co-evolving time series, the generated node embedding tensor is fed into the tensor recurrent neural network to generate encoded temporal dynamics, and hidden states of the tensor recurrent neural network and the generated node embedding tensor are input to the neural network model to predict a snapshot of a next time step.

12. The system of claim 11, wherein the hardware processor is further configured to impute missing values in the co-evolving time series based on the node embeddings using the trained tensor graph convolutional network.

13. The system of claim 11, wherein the tensor recurrent neural network is structured to reduce dimensionality of the generated node embeddings.

14. The system of claim 11, wherein the tensor recurrent neural network includes a tensor long short-term memory.

15. A computer program product comprising a computer readable storage medium having program instructions embodied therewith, the program instructions readable by a device to cause the device to:
receive co-evolving time series having multiple modes, different modes of the multiple modes having different relationships between the multiple modes;
structure a tensor graph convolutional network that incorporates the multiple modes and relationships of the multiple modes;
train the tensor graph convolutional network to generate node embeddings associated with a snapshot of the co-evolving time series at time t;
structure a tensor recurrent neural network;
train the tensor recurrent neural network to generate temporal dynamics associated with the co-evolving time series based on the generated node embeddings, the tensor recurrent neural network modeling relationship between the temporal dynamics, wherein a degree of the modeled relationship is preconfigurable; and
train a neural network model to forecast a prediction for the co-evolving time series based on the generated node embeddings and the generated temporal dynamics, the neural network model being a multi-layer perceptron;
wherein at each time step, a snapshot from a tensor time series is input to the tensor graph convolutional network to generate a node embedding tensor, the tensor graph convolutional network jointly modeling the tensor time series by simultaneously performing convolution on multiple independent graph convolutional networks representing the co-evolving time series having multiple modes to capture synergy between the multiple modes of the co-evolving time series, the generated node embedding tensor is fed into the tensor recurrent neural network to generate encoded temporal dynamics, and hidden states of the tensor recurrent neural network and the generated node embedding tensor are input to the neural network model to predict a snapshot of a next time step.

16. The computer program product of claim 15, wherein the device is further caused to impute missing values in the co-evolving time series based on the node embeddings using the trained tensor graph convolutional network.

17. A computer-implemented method comprising:
receiving co-evolving time series having multiple modes, different modes of the multiple modes having different relationships between the multiple modes;
training the tensor graph convolutional network, using the co-evolving time series and adjacency matrices associated with the multiple modes in the co-evolving time series, to generate node embeddings associated with a snapshot of the co-evolving time series at time t;
training a tensor recurrent neural network to generate temporal dynamics associated with the co-evolving time series based on the generated node embeddings, the tensor recurrent neural network modeling relationship between the temporal dynamics, wherein a degree of the modeled relationship is preconfigurable; and
training a neural network model to forecast a prediction for the co-evolving time series based on the generated node embeddings and the generated temporal dynam-
ics, the neural network model being a multi-layer
perceptron, wherein the training of the tensor graph convolutional
network, the tensor recurrent neural network and the
neural network model are performed jointly;

wherein at each time step, a snapshot from a tensor time
series is input to the tensor graph convolutional net-
work to generate a node embedding tensor, the tensor
graph convolutional network jointly modeling the tensor time series by simultaneously performing convo-
lution on multiple independent graph convolutional
networks representing the co-evolving time series hav-
ing multiple modes to capture synergy between the
multiple modes of the co-evolving time series, the
generated node embedding tensor is fed into the tensor
recurrent neural network to generate encoded temporal
dynamics, and hidden states of the tensor recurrent
neural network and the generated node embedding
tensor are input to the neural network model to predict
a snapshot of a next time step.

*   *   *   *   *